(12) United States Patent
Dharmarajan et al.

(10) Patent No.: US 7,593,548 B2
(45) Date of Patent: Sep. 22, 2009

(54) SECURE AND ANONYMOUS STORAGE AND ACCESSIBILITY FOR SENSITIVE DATA

(75) Inventors: Baskaran Dharmarajan, Sunnyvale, CA (US); Jay C. Jacobs, Danville, CA (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 11/300,920

(22) Filed: Dec. 15, 2005

(65) Prior Publication Data

US 2007/0140489 A1 Jun. 21, 2007

(51) Int. Cl.
*G06K 9/00* (2006.01)
*H04N 7/167* (2006.01)
(52) U.S. Cl. .................. 382/103; 382/243; 380/201
(58) Field of Classification Search .............. 382/100, 382/103, 112, 113, 114, 115, 116, 135, 136, 382/137, 138, 139, 140, 155, 162, 181–190, 382/209, 232, 254, 274, 276, 285, 312, 318, 382/322, 305, 243; 705/50, 65, 44; 380/201
See application file for complete search history.

(56) References Cited

U.S. PATENT DOCUMENTS

| | | | | |
|---|---|---|---|---|
| 5,850,442 A | * | 12/1998 | Muftic ..................... | 705/65 |
| 5,987,440 A | * | 11/1999 | O'Neil et al. ............. | 705/44 |
| 7,016,877 B1 | * | 3/2006 | Steele et al. .............. | 705/50 |
| 7,222,100 B2 | * | 5/2007 | Tresser ..................... | 705/50 |
| 7,289,971 B1 | * | 10/2007 | O'Neil et al. ............. | 705/44 |

* cited by examiner

*Primary Examiner*—Seyed Azarian
(74) *Attorney, Agent, or Firm*—Shook Hardy & Bacon L.L.P.

(57) ABSTRACT

The subject disclosure pertains to secure and anonymous data storage and access. More particularly, encryption methods and mechanisms are provided in conjunction with one or more blobs, identities, and guards to implement one or more layers of indirect encryption. Generation of these components can be accomplished without including or pointing to any personally identifiable information about a user. Accordingly, a user can store sensitive data securely and anonymously on a server or like storage system. Such data can also be roamed, recovered, and synchronized securely from a plurality of computers at least because the data is centrally located.

20 Claims, 28 Drawing Sheets

SECURE AND ANONYMOUS STORAGE AND ACCESSIBILITY FOR SENSITIVE DATA

BACKGROUND

With the growing use of the Internet and secure web sites that require user login/password to be able to access sensitive data such as bank accounts, confidential email, credit card information, merchant accounts etc., users are required to remember a lot of sensitive data, such as the user account name and password for these sites. Given the myriad of rules that apply to login and password fields at sites, it is almost impossible for a user to remember all the details. By way of example, user login can be a social security number at some sites, an email address at others, and an oblique character string (e.g., "baskd2485)" at yet other sites. Similarly, passwords follow different rules with respect to mix of letter case, symbols and numbers and length. To deal with this quagmire, many users just store this type of information in a normal document such as a text file or a word processing document. However, this is especially insecure as the data is stored in plain text and is available to anyone with access to the files to see in plain sight.

Form-fill applications such as those offered in browser toolbars have been created in recent years to fill this gap. They offer some level of security in that the data is encrypted with a master password and the user needs to remember just the master password. While this is better than plain files, all known current form-fill applications are inadequate for several reasons. First, the data could be lost if there is a hard-disk corruption/computer failure. Second, the data is not available for access on any computer other than the one where it is stored and finally keeping the data synchronized across multiple computers is cumbersome, because it can be done only manually.

One solution to portability and synchronization issues is to allow the storage of the data on portable storage devices such as USB key chain storage devices. While this helps in some ways, there is still the risk of the storage device being lost or damaged resulting in total loss of data. It also means that the device has to be carried around and there is no access unless you have the device at hand.

Many of these problems would disappear if the data could be stored on a server side. Indeed, many systems store data including credit-card numbers on such sites. However, this is not without its demerits either including but not limited to lack of privacy, at least because the server stores such information in plain text or the key used in encryption is co-located in a data-center. Such storage techniques may allow any hacker who gains sufficient privileges to the computers at the data-center including any malicious employees of the company running the center to retrieve sensitive data, often with relative ease. Moreover, companies running these data-centers run serious risks with respect to liability & goodwill from any accidental exposure of which there have been numerous instances in the past.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation pertains to systems and methods for secure and anonymous storage and accessibility for sensitive data. In accordance with an aspect of the subject innovation data can be stored and accessed utilizing one or more blobs, identities, and guards. For example, a data blob can correspond to user data encrypted by a data key stored on a server or like system. The data key itself can correspond to a blob encrypted by another key and housed on a client machine. Hence, the encrypted data and the key are stored on completely different machines making deciphering encrypted data more difficult.

In accordance with another aspect of the innovation, anonymous identities are associated with blobs and facilitate identification of blobs without including or pointing to any personally identifiable information of a user. Guards are also associated with blobs and are generated based at least in part upon a key associated with related blob. Accordingly, in addition to identifying a blob for retrieval a user must provide a matching guard before the blob is transmitted to indicate that the requesting entity knows the key. Among other things, this prevents malicious individuals from retrieving the blob and launching an extended offline attack on the blob to learn the information included therein. However, even if the blob where to be decrypted, damage would be mitigated at least because the data is not traceable to a particular individual.

The blob, anonymous identity, guard techniques for securely storing data can be applied in various contexts and combinations to provide particular desired functionality. For example, in accordance with an aspect of the subject innovation, both premeditated and random roaming can be securely implemented utilizing variations on these techniques. Further yet, recovery of data from a crashed or otherwise inaccessible machine and master password reset are also provided in accordance with an aspect of the subject innovation.

In accordance with yet another aspect of the subject innovation, human interactive proofs or challenges can be employed in conjunction with other encryption mechanisms and methodologies provided herein to ensure that a human being is utilizing a client system and thereby thwart attacks by automatons.

In accordance with yet another aspect of the subject innovation, synchronization of data across multiple machines is easily and securely accomplished due at least in part to the central storage of data and several layers of indirect encryption.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

As used in this application, the terms "component" and "system" and the like are intended to refer to a computer-related entity; either hardware, a combination of hardware and software, software or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
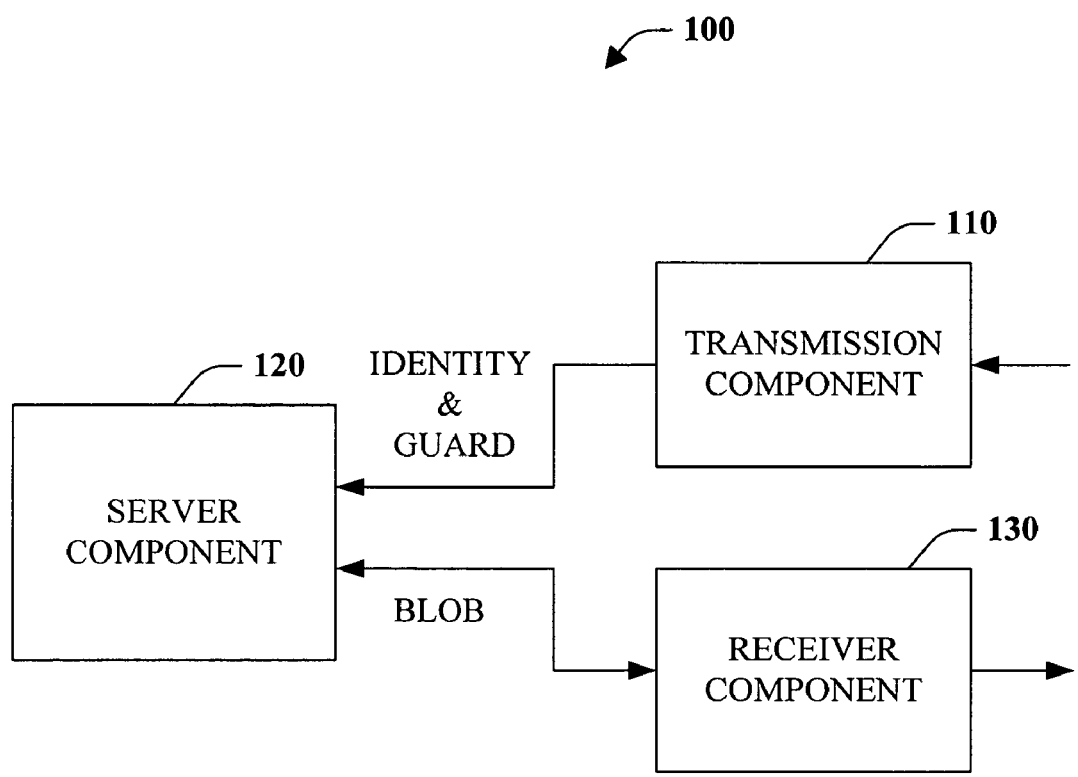
FIG. 1 is a block diagram of a data access system.

Turning initially to FIG. 1, a data access system 100 is depicted in accordance with an aspect of the subject innovation. System 100 includes a transmission component 110, a server 120, and a receiver component 130. The transmission component 110 can receive, retrieve or otherwise acquire an identity and a guard (which can be components as defined herein). The identity anonymously identifies a blob. The guard provides information that indicates that a requesting entity knows the key required to decrypt the blob. This prevents a hacker from obtaining the blob by mere identification and subsequently launching a concerted attach over an extended period of time on an offline system, for example, to decrypt the blob and access data provided thereby.

Figure 2:
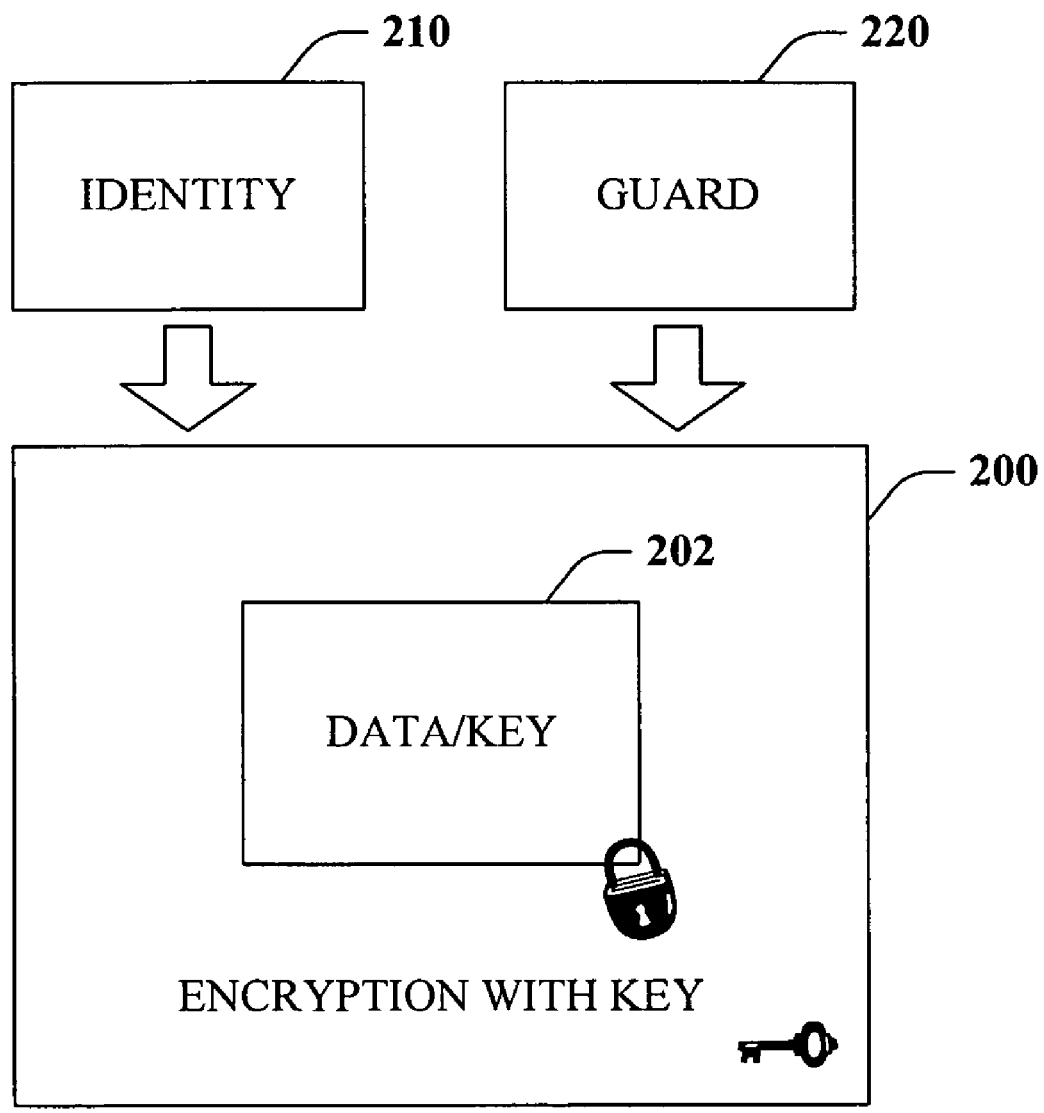
FIG. 2 is a block diagram of a blob.

Turning briefly to FIG. 2, a blob 200 and associated mechanisms are illustrated. Generally speaking, a blob 200 is an arbitrary collection of opaque data. A storing system does not know nor does it need to know anything about the content, format, or the like associated with the mass of data known as a blob. Still further yet, a blob as used herein refers to encrypted data. As illustrated, blob 200 includes data 202 encrypted with a key. Blob 200 is also associated with an identity component 210 and a guard component 220 that identify and control access to the blob 200. As will be described in further detail infra the identity 210 and guard information do not reveal any information that can be traced back to a particular user.

Figure 3:
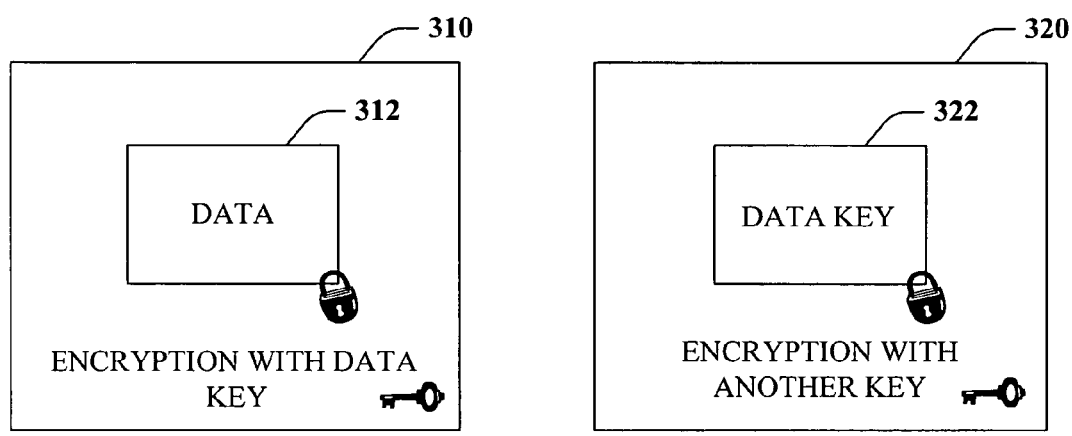
FIG. 3 illustrates two exemplary types of blobs and their relationship.

FIG. 3 identifies two exemplary blobs 310 and 320 to illustrate how blobs can be related and employed to implement indirect encryption in accordance with an aspect of the subject innovation. Blob 310 encrypts something of interest such as data with a data key 322. Blob 320 encrypts the data key 322 with another key. This relationship can be employed over different sets of data in various ways to accomplish particular purposes. In accordance with an aspect of the innovation, the data 310 can correspond to secure user data such as one or more user/login names and passwords. Such data can then be employed to enable easy access to user name and/or password-protected applications and web sites.

Turning back to FIG. 1, the identity and guard are transmitted to a server component 120 or other type of centrally managed storage system. The server 120 can locate a requested blob based on the identity. Subsequently, the server 120 can compare a guard associated with the identified blob and the provided guard. If there is a match, it is verified that the requesting entity knows the key and the server provides or transmits the blob back to the requesting entity. The receiver component 130 receives, retrieves or otherwise obtains or acquires the blob from the server component 120. The blob can then be decrypted and employed, for example to automatically fill in user names and/or passwords.

Figure 4:
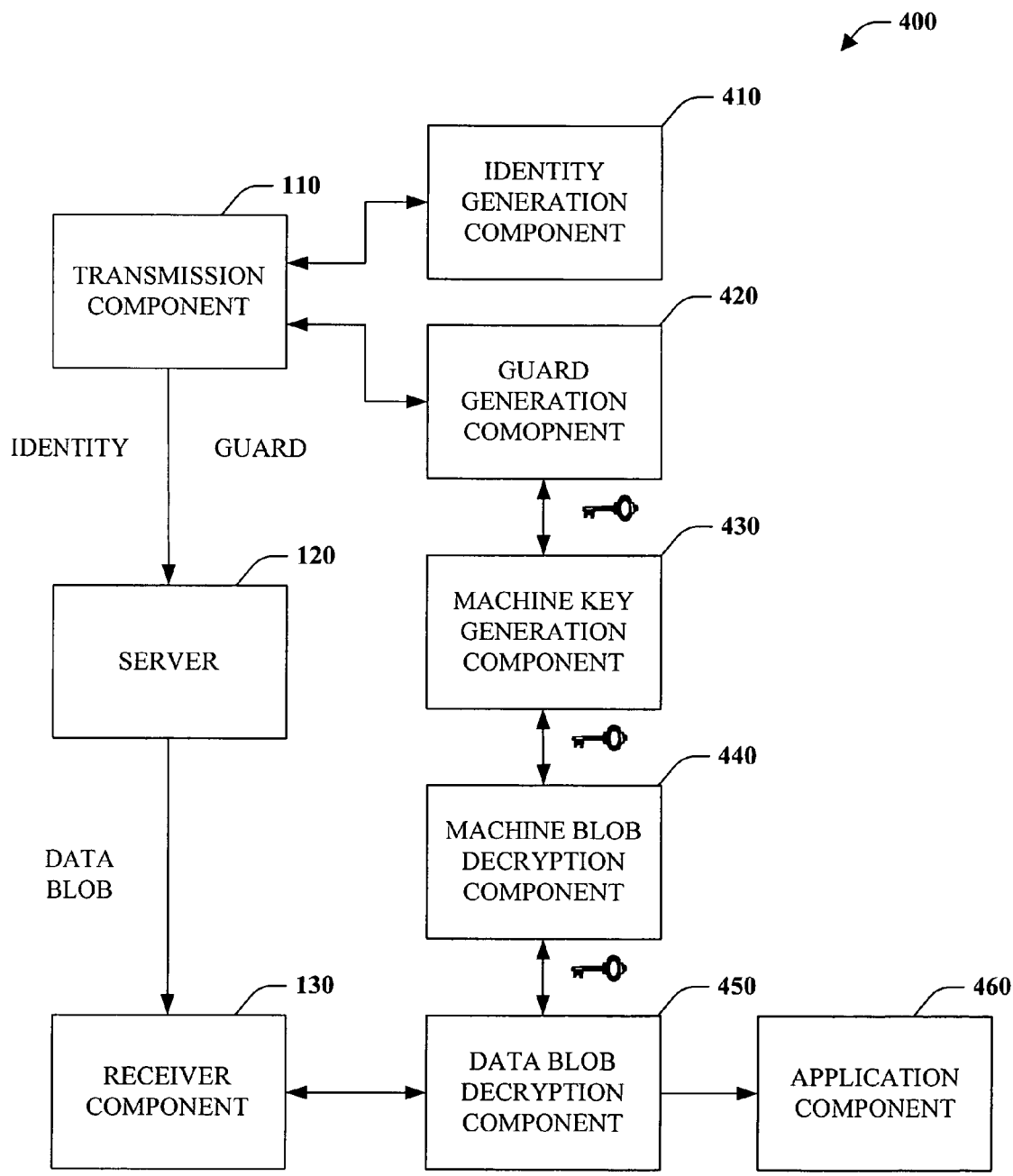
FIG. 4 is block diagram of a data access system.

Continuing with FIG. 4, a data access system 400 is illustrated. System 400 includes identity and guard generation components 410 and 420, respectively. Identity generation component 410 can generate an identity from a variety of sources, for instance in the form of a hash (e.g., SHA). Accordingly, to one aspect of the innovation, identity can be derived from a machine and user GUID (Globally Unique Identifier). The machine GUID is generated and associated with a particular physical machine. Similarly, a user GUID is generated associated with a user and their data on a particular machine. The guard component 420 can generate a guard from a data key and one or more pieces of data from a variety of sources. For example, the guard can be generated utilizing a hash created from the machine GUID, user GUID and data key. Further yet, the guard as well as the identity may be associated with salt. Salt is a system wide well known number and is utilized to make any possible dictionary attacks on multiple hashes more difficult. Additionally, all hashing can involve some large number of iterations. The number of iterations would be a system wide constant for each type of hash. Iterations make it even more difficult to launch an offline attach on a database of hashes. The data key employed by guard generation component 420 can be generated and provided by machine key generation component 430. Key generation component 430 can generate a key, for instance by employing a cryptographically safe random number generator.

The identity and guard generation components 410 and 420 are communicatively coupled to the transmission component 110. Accordingly, transmission component 110 can receive or retrieve a generated identity and guard from respective components 410 and 420. The transmission component 110 is communicatively coupled to the server component 120 and can thus transmit the identity and guard thereto. The server component 120 can analyze the guard and identity and return a data blob to receiver component 130, if the data blob identity and guard match the provided corresponding values.

Receiver component 130 is communicatively coupled to both the server component 120 and the data blob decryption component 450. Upon receipt or retrieval of the data blob, receiver component can provide the data blob to the data blob decryption component 450. The decryption component 450 is communicatively coupled to the machine blob decryption component 440, which is coupled to machine key generation component 430. The machine key generation component 430 provides the generated machine key to the machine blob decryption component that employs the key to decrypt the machine blob and reveal a data key. This data key is then provided to data blob decryption component 450 and utilized to decrypt the data blob to reveal user data.

Data blob decryption component 450 can also be communicatively coupled to an application component 460 that can utilize the user data. By way of example and not limitation, the application component 460 can correspond to an automatic user name and password completion component that as the name suggests automatically provides such values from the user data.

Figure 5:
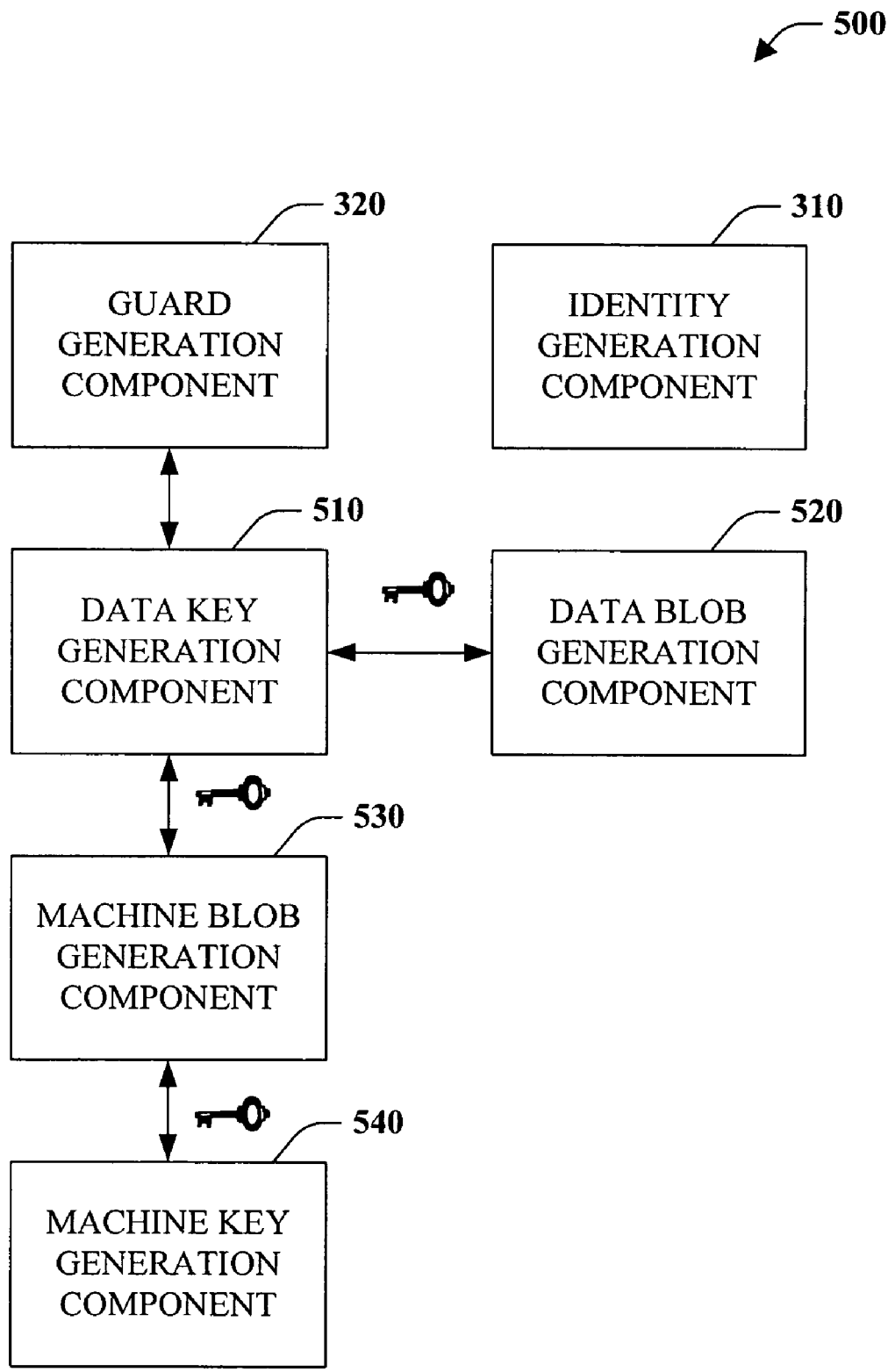
FIG. 5 is a block diagram of a data storage system.

FIG. 5 illustrates a data access set up system 500 in accordance with an aspect of the subject invention. System 500 facilitates the initial storage of a data blob; the retrieval of which has been described supra. System 500 includes a machine identity generation component. System 500 includes an identity generation component 310 and guard generation component 320 as previously described. In brief, the identity component 310 generates a unique and anonymous identifier for instance based on a hash of values such as machine and user GUIDs. Guard component can similar be generated from a hash of values such as the machine and user GUIDs as well as a data key.

Data key generation component 510 is communicatively coupled to the guard generation component 320 and provides a data key to component 320 to enable generation of a guard thereby. The data key can be generated in any number of a manners including but not limited to generation of a cryptographically safe random number. The data key generation component 510 is also communicatively coupled to data blob generation component 520 and provides a copy of the data key thereto. The data blob generation component 520 generates a data blob by encrypting data with the provided data key.

Data key generation component 510 is also communicatively coupled to the machine blob generation component 530, which is coupled to the machine key generation component 540. Machine key generation component 540 generates a key from one or more values including but not limited to the machine GUID, user GUID and a user password. Data key generation component 510 and machine key generation component 540 both provide keys to the machine blob generation component 530. The machine blob generation component 530 generates a machine blob by encrypting the data key with the machine key.

A portion of the generated components can be transmitted and stored to a central storage system such as a server. In particular, the data blob and associated machine identification and guard can be stored to a server. The machine blob and associated machine key can be stored on a client system. Additionally or alternatively, the machine blob could be stored to the server. In this instance, the machine blob could require generation and saving of an associated identity and guard or be linked at least in part to the identity and guard associated with the data blob forming part of an account.

Figure 6:
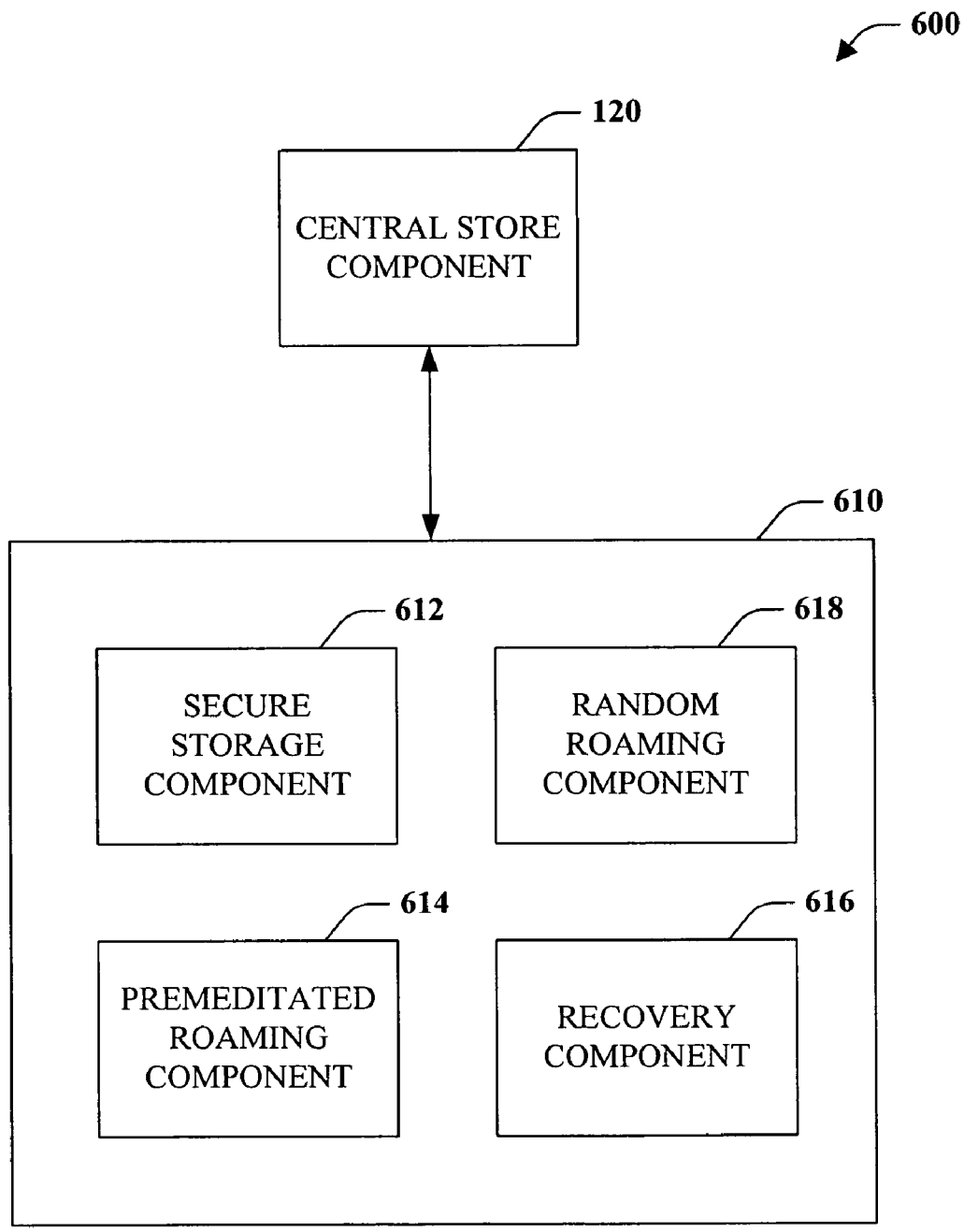
FIG. 6 is a block diagram of a secure data access system.

FIG. 6 depicts a secure data access system 600 in accordance with an aspect of the subject innovation. As illustrated system 600 includes a central store component or server 120 and a client component 610 communicatively coupled thereto. The client component 610 can correspond to but is not limited to a client application program. The client component 610 includes a plurality of sub components that provide particular functionality such as secure storage component 612, premeditated roaming component 614, recovery component 616, and free roaming component 618.

Secure storage component 612 functionality has been previously described. In brief, data can be encrypted as a blob and stored on the central storage component 120 along with an identifier and a guard. Upon generation of a matching identifier and guard, the blob can be downloaded and decrypted with a machine key to produce an unencrypted version of the data.

Premeditated roaming component 614 enables data to be roamed to another machine when you know ahead of time that you want the data to roam. For example, a user may want to roam data from an office computer to a home computer. This type of roaming is conventionally accomplished by storing data on a removable storage medium or sending the data to one self via web enabled email.

Recovery component 616 provides a mechanism to recover data and/or a reset a password. For example, recovery component 616 can enable recovery of a machine and user GUIDs associated with an inoperable or crashed machine. Furthermore, a user can reset a master password they forgot.

Random roaming component 618 provides a mechanism for roaming data without planning ahead. An example of a scenario would be trying to get to data in the conventional case where the removable storage device or email was lost or forgotten.

Prior to employing the functionality provided by any of the client sub-components 612-618, the system can be set up to enable such functionality. Accordingly, what follows are systems for setting up and utilizing the provided functionality for the premeditated component 614, recovery component 616 and free roaming component 618. Similar systems for the secure storage component were previously described with respect to FIGS. 4 and 5.

Figure 7:
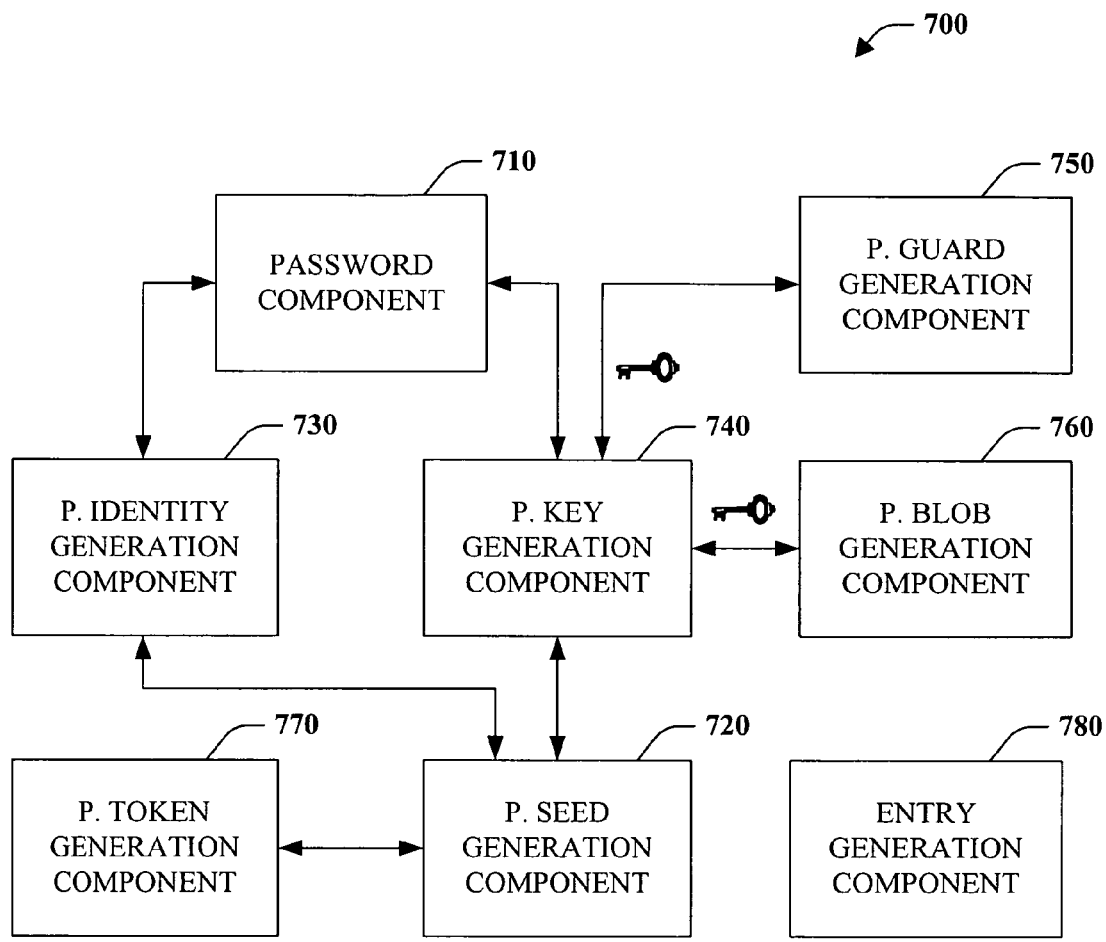
FIG. 7 is a block diagram of a system for setting up premeditated roaming.

FIG. 7 depicts a system 700 for setting up premeditated roaming in accordance with an aspect of the subject innovation. One technique for premeditated roaming is to generate a premeditated token that can be transported and provided to another machine. System 700 includes password component 710. Password component 710 is operable to request and receive a password from a user and communicate the password to premeditated identity component 730 and premeditated key component 740. Premeditated seed generation component 720 can produce a safe random number. This number can then be provided to the identity and key generation components 720 and 730 to facilitate generation of a premeditated identity and guard. For example, the premeditated identity and key can be derived from the seed and user password. The generated key can then be provided to premeditated guard generation component 750. The guard can be generated from a hash of the key and optionally some salt. Furthermore, the key can be received or retrieved from the premeditated blob generation component 760 to generate the premeditated blob via encryption of a data key with the premeditated key. The premeditated seed component 720 can transmit the generated seed to the token generation component 770. Token generation component 770 can generate a token comprising the seed and validity dates, among other things. The token itself can be associated with the entry for the machine the user is employing to generate the token. Finally, system 700 includes an entry component 780 associated with an account that generates a machine entry providing important system information. Table 1 illustrates an exemplary machine entry structure:

TABLE 1

| Field Name | Size | Comments |
| --- | --- | --- |
| Magic | 4 bytes | To identify the structure |
| Version | 4 bytes | The version of this structure, for future extensibility. |
| Length | 4 bytes | Length of the machine's friendly name in bytes |
| Machine Name | Variable | The machine's friendly name as a Unicode string (not null terminated). |
| Machine GUID | 16 bytes | The Machine GUID |
| User GUID | 16 bytes | The User GUID |
| Hash | 20 bytes | The hash of everything above |

The machine entry can be linked to the data blob identity and guard. The generated machine entry, premeditated identity, premeditated guard, and premeditated blob can then be transmitted or uploaded to a server or central location by suitable means. The token can then be saved, emailed, hand written, or the like to facilitate later employment thereof.

Figure 8:
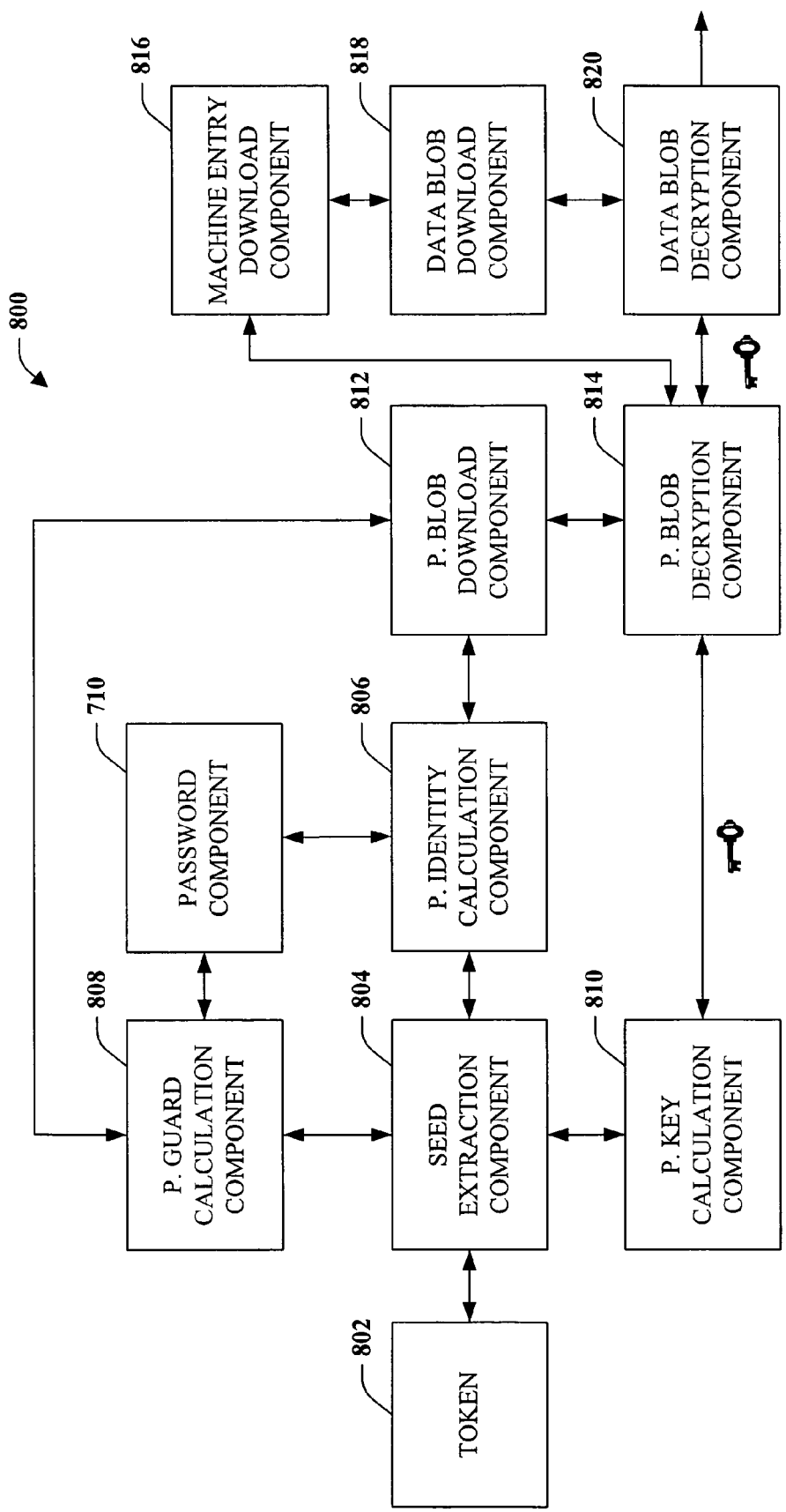
FIG. 8 is a block diagram of a system of premeditated roaming.

Turning to FIG. 8, a premeditated roaming system 800 is illustrated for roaming data. Seed extraction component 804 receives or retrieves token 802 and extracts the seed value stored thereby. The seed extraction component 804 is communicatively coupled to premeditated guard calculation component 808, premeditated identity calculation component 806 and premeditated key calculation component 810. Premeditated key calculation component 810 receives or retrieves the seed and calculates a key based at least in part thereon. Password component 710 requests and receives or retrieves a user password that is provided to premeditated guard calculation component 808 and premeditated identity calculation component 806. Based on the seed and password a premeditated guard and identity can be calculated by respective components 808 and 806. The premeditated blob download component 812 receives or retrieves the calculated guard and identity and based thereon downloads or receives the premeditated blob from a server or like component. The premeditated blob and the premeditated key are provided to or retrieved by premeditated blob decryption component 814 that applies the key to reveal the data key. The data key can be transmitted to the machine entry download component 816, which can retrieve or receive the machine entry from a server based on the data key. Data blob download component 818 can utilize the machine entry data such as machine and user GUIDs to generate a machine identity and guard to enable the data blob to be downloaded. The downloaded data blob is then provided to the data blob decryption component 820 that decrypts the blob based on the data key provided by the premeditated blob decryption component 814 to reveal the user data.

Figure 9:
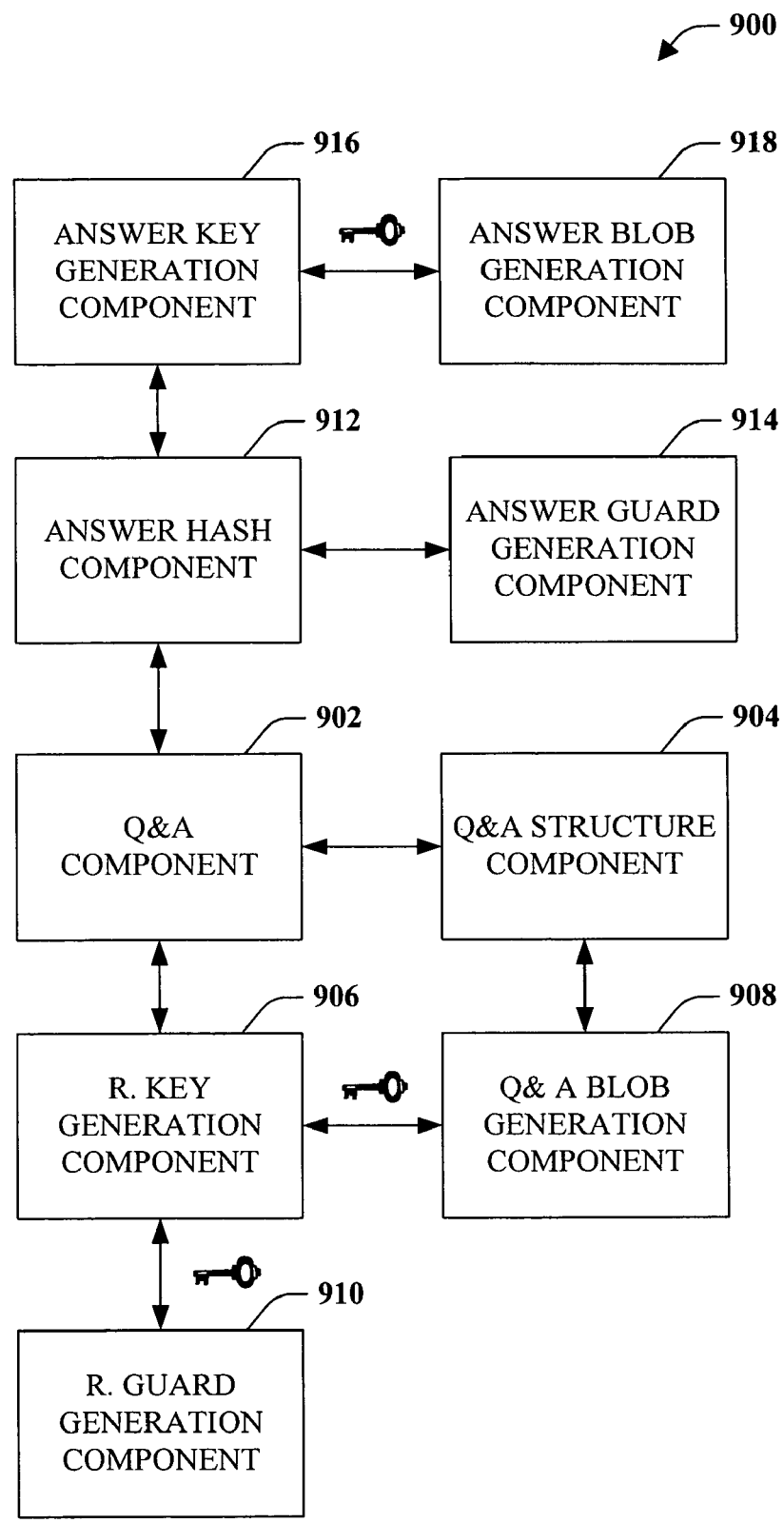
FIG. 9 is a block diagram of a system for setting up recovery.

FIG. 9 provides a system 900 for setting up recovery from a machine in accordance with an aspect of the subject innovation. System 900 includes a question and answer (Q&A) component 902 that can present questions to a user and receive answers. In particular, the Q&A component 902 can present identity questions requiring a user to enter information such as full name (first, middle and last), birth date, birth place, birth country and mother's maiden name (first, middle last). More difficult questions can also be provided that require input of information such as user's phone number, user's email address, the door number and street name of the user's mailing address, year an important event occurred and type of event (event can be free form), first name of a relative or pet's name along with choice such as person or pet name and a description (e.g., my daughter, my best friend, my dog . . . ). To achieve a higher degree of protection stronger questions can be asked. For example, a user may be asked to answer one or more questions regarding social security number (U.S. only), credit card number and type, passport number and country, bank account number and type, and driver's license country, state, and/or number. These types of questions jog one's memory, while still eliciting data useful in the computation of various items. The answers can be provided the Q&A structure component, which can package (e.g., concatenated and hashed) the answers into a Q&A structure such as that provided in Table 2.

TABLE 2

| Field Name | Size | Comments |
| --- | --- | --- |
| Magic | 4 bytes | To identify this structure |
| Version | 4 bytes | The version of the structure for future extensibility. |
| NumberOf questions | 4 bytes | The number of questions contained. |
| Questions | Variable | An array of structures of the following format: |

TABLE 2-continued

| Field Name | Size | Comments |
|---|---|---|
| Type of question | 4 bytes | Medium or Strong |
| Length of the question | 4 bytes | The length of the question in bytes |
| The question | Variable | The rephrased question as a Unicode string (not null terminated) |
| Structure Hash | 20 bytes | The SHA hash of this structure with the exclusion of this field. |

The recovery key component 906 can receive or retrieve answers from the Q&A component 902. Based on the answers and the machine GUID and user GUID a recovery key can be created by the component 906. The recovery key can subsequently be transmitted to recovery guard generation 910, which can generate a recovery guard based on the key, among other things. The recovery key is also provided to the Q&A blob generation component 908. The component 908 generates a Q&A blob by encrypting the Q&A structure with the recovery key.

Q&A component 902 can also provide answers to answer hash component 912 that generates a hash of the answers. This hash can then be provided to the answer guard generation component 914 to facilitate generation of an answer guard and to answer key generation component 916 to facilitate generation of an answer key, for instance derived from the hash and system salt. The answer key generation component 916 can then provide the answer key to answer blob component 918. Component 918 encrypts the data key for user data with the answer key to generate an answer blob.

Figure 10:
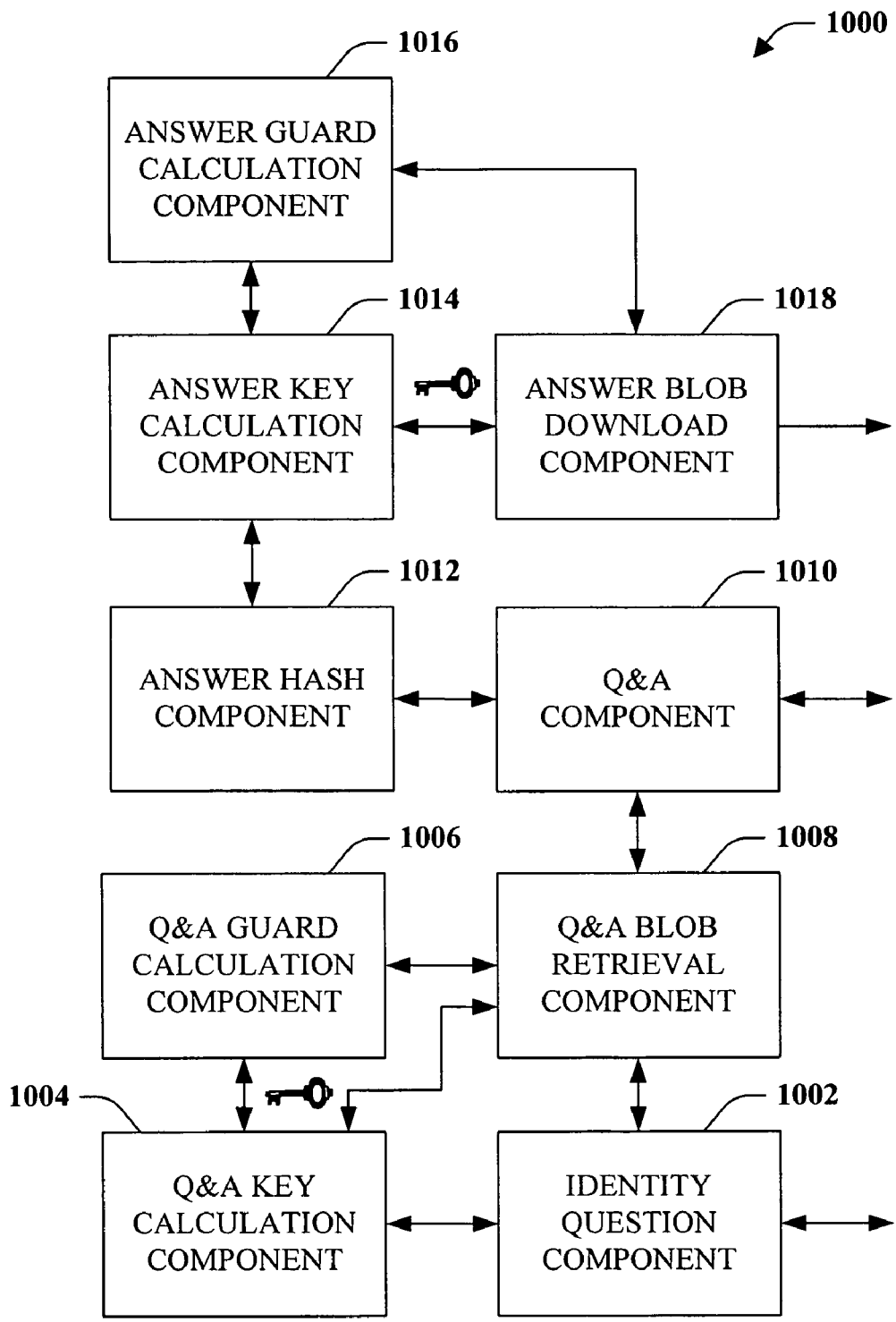
FIG. 10 is a block diagram of a recovery system.

FIG. 10 illustrates a recovery system 1000 in accordance with an aspect of the subject innovation. The system 1000 includes an identity question component 1002 that asks users identity questions and receives answers regarding a user's phone number, email address, door number and street address, and the like. Furthermore, it should be appreciated that identity question component 1002 can ask and/or rephrase questions in a more user friendly manner base on previously provided information such as please provide your email address ending with "@aol.com," or please provide the year the event you described as "my wedding" happened, and the like. The answers to identity questions can be provided in some form to Q&A key calculation component 1004 that can generate a Q&A key based on the answers and other information such as user and machine GUIDs. The key can then be provided from component 1004 to Q&A guard calculation component 1006. The guard calculation component 1006 can then compute a guard based on the key such as a hash thereof plus some salt. The Q&A identity and guard are provided to the Q&A retrieval component that retrieves the Q&A blob based thereon. The component 1008 can also decrypt the blob based on the Q&A key calculated to reveal the Q&A structure. The Q&A structure can then be employed by Q&A component 1010 to ask users stronger questions and receive answers thereto. For example, the Q&A component 1010 could correspond to a wizard presenting a series of questions to a user in via a graphical interface. The answers are provided by the Q&A component to the answer hash component 1012 that generates a hash based thereon. The hash can then be provided to the answer key calculation component 1014 to facilitate generation of an answer key. The answer key can then be provided to the answer guard component 1016 to enable an answer guard to be generated based on the key, among other things. The answer blob download component 1018 can subsequently download the answer blob based on the provided among other things. Furthermore, the answer blob download component can receive the answer key and decrypt the blob to reveal the data key. The data key can then be employed to retrieve the machine entry and subsequently the machine blob, which can be decrypted with the data key.

Figure 11:
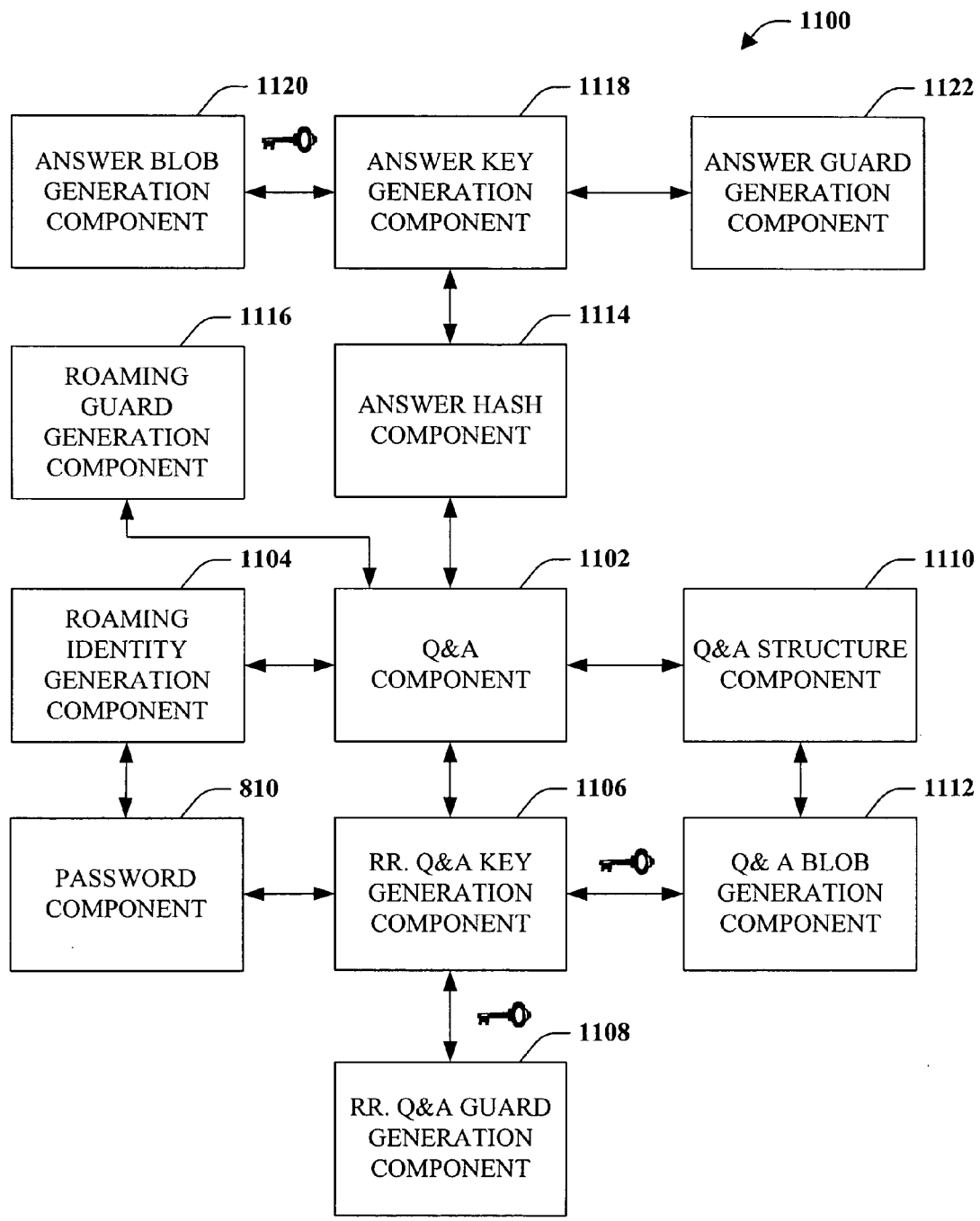
FIG. 11 is a block diagram of a system for setting up random roaming.

FIG. 11 illustrates a system 1100 for setting up random roaming in accordance with an aspect of the subject innovation. The system 1100 includes a Q&A component 1102 that queries and receives responses from a user similar to Q&A component 902 of FIG. 9. Likewise the answers to the questions and the questions can be provided to Q&A structure component 1110 that generates a Q&A structure such as that provided by Table 2. The answers of some form thereof are also provided to the random roaming identity component 1104 and the random roaming key generation component 1106. The system also includes a password component that requests and receives or retrieves a user password that can be provided to random roaming identity component 1104 and the random roaming key generation component 1106. Based upon the password and the answers, components 1104 and 1106 can generate a random roaming identity and a random roaming key. Random roaming key can then be provided to the random roaming guard generation component 1108 to enable generation of a guard based thereon. Furthermore, the random roaming key can be provided to the Q&A blob generation component that encrypts the Q&A structure with the roaming key.

The Q&A component 1102 can also provide answers to answer hash component 1114 that generates an answer hash from the answers. The answer hash can then be provided to the answer key generation component 1118 that generates an answer key based on at least the answer hash. The answer key can then be provided to the answer guard generation component 1122 that generates answer guard based thereon. The answer key can also be provided to the answer blob generation component 1120 that generates an answer blob by encrypting the data key with the answer key. Furthermore, the roaming guard 1116 can be computed by the roaming guard generation component based on answers to questions provided by Q&A component 1102. Finally, the identities, guards and blobs can be uploaded or saved to a server or like storage location.

Figure 12:
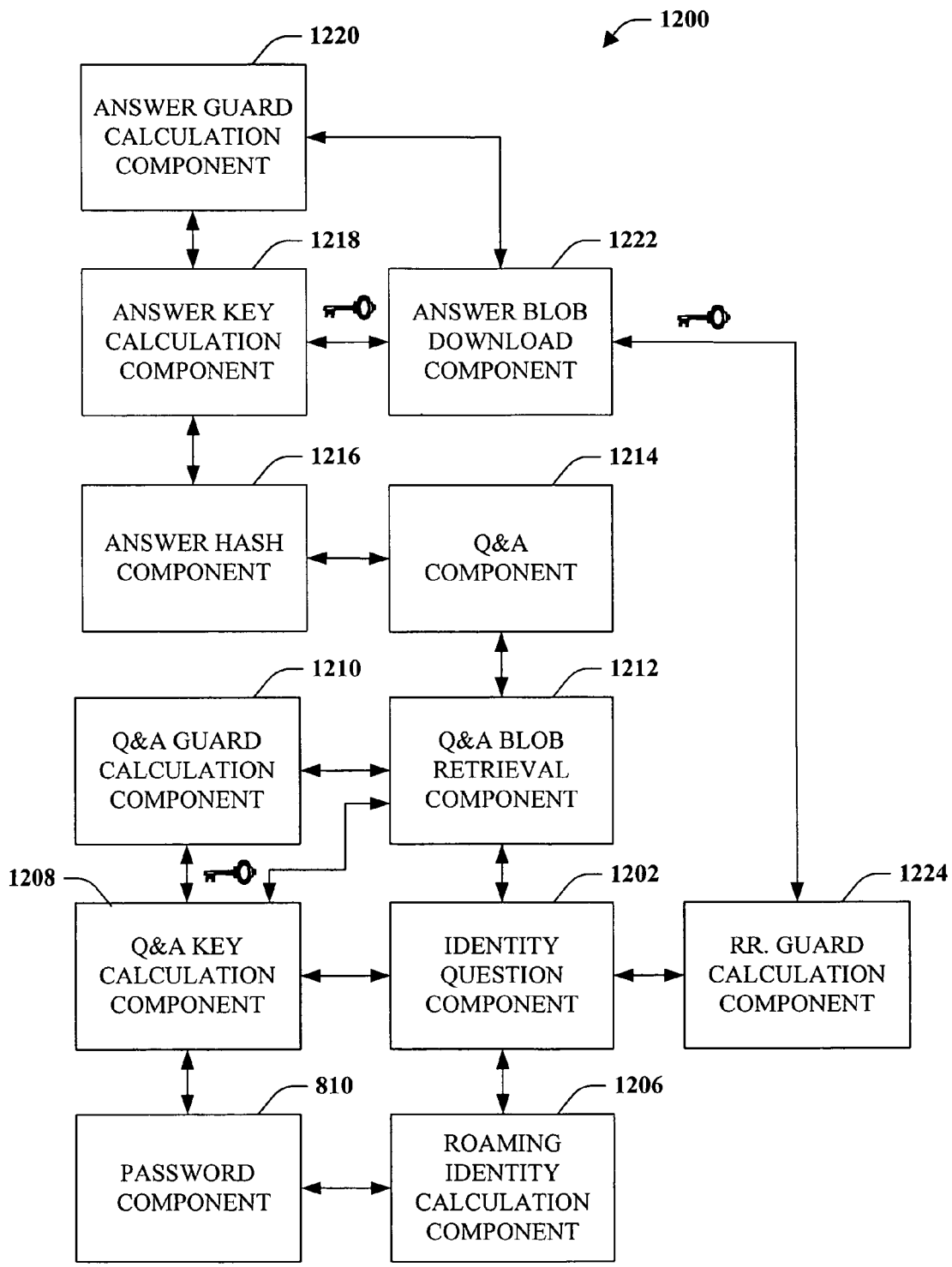
FIG. 12 is a block diagram of the random roaming system.

FIG. 12 depicts a random roaming system 1200 in accordance with an aspect of the subject innovation. System 1200 includes an identity component 1202 that asks a user identity questions such as their name, address, email and the like. The system 1200 also includes a password component 810 that requests and receives a password from a user. The password and the identity can be provided to the roaming identity calculation component that calculates an identity based thereon. Furthermore, the password and identity can be provided to the Q&A key calculation component to which derives a key based on such information. The Q&A key component 1208 then provides the Q&A key to the Q&A guard component 1210, which calculates a guard based at least upon the Q&A key. The Q&A guard and key are provided to the Q&A blob retrieval component 1212. The Q&A blob retrieval component utilizes the guard to enable download of the Q&A blob and can also decrypt the blob with the Q&A key to produce a Q&A structure. The structure is then provided to Q&A component 1214.

Q&A component 1214 is similar to that of FIGS. 9 and 10. The Q&A component 1214 queries a user with questions and receives answers. Furthermore, the questions can be presented in a user-friendly format to aid the user in entering the appropriate information. For example, "Enter your credit card number ending in 5506." The answers to the questions are provided in some form to answer hash component 1216 from the Q&A component 1214. A hash can subsequently be generated from the answers. The answer key calculation component 1218 can receive or retrieve the hash from answer hash component 1216 and generate an answer key based at least upon the hash. The answer key can then be provided to or retrieved by answer guard calculation component 1220. The answer guard calculation component 1220 can then generate an answer guard based at least upon the answer key. The answer guard and answer key can be provided to or retrieved by the answer blob download component 1222. Employing this information the answer blob can be downloaded and decrypted to produce the data key. The roaming guard calculation component 1224 can subsequently retrieve or receive the data key from the answer blob download component 1222 and compute the roaming guard.

At this point, all that needs to be known is known and data can be downloaded, decrypted and used on a temporary basis. The data and keys can also be re-encrypted and uploaded as necessary to create a new machine account, if desired, by utilizing a premeditated new machine set up system.

Premeditated tokens can be obtained only if a new machine is to be setup. However, a new machine may be temporarily set up and removed if the user so desires because to use roaming on a given machine one needs to answer all questions each time. A user could be warned and encouraged to setup a premeditated token for future access if they do not want to set the current machine as a new machine. Further, if a new machine is set up, recovery can be enabled on the new machine if the user desires using the systems proved above on premeditated new machine recovery set up. Note that where a given machine has crashed and is being built from scratch, random roaming can be used to recover and re-establish the machine for the account.

Figure 13:
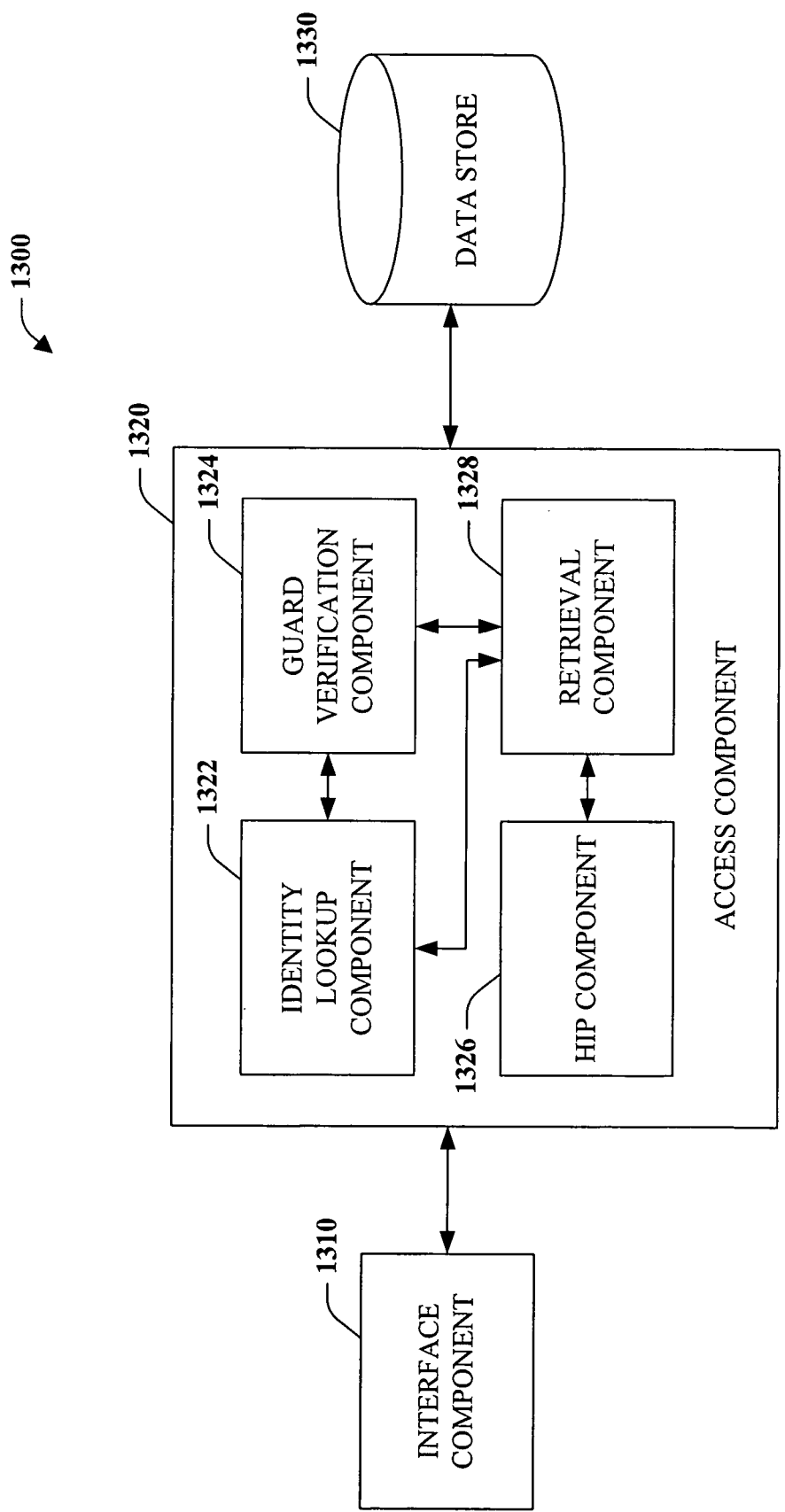
FIG. 13 is a block diagram of a data distribution system.

FIG. 13 illustrates a data distribution system 1300 in accordance with an aspect of the subject innovation. The system can include an interface component 1310 and access component 1320 and a data store or storage system 1330. Interface component can facilitate interaction with other systems and components. In particular, interface component 1320 can be an application programming interface (API). The interface component 1320 can receive a request for data such as a blob. With such a request, a guard and identity are provided. The identity identifies a particular blob for retrieval and the guard provides an indication that the blob key is known. The identity and the guard are provided to the access component 1320. Access component 1320 can control access to and distribution of blobs and other data structures. In accordance with an aspect of the invention, the access component 1320 can include an identity lookup component 1322 and a guard verification component 1324. The identity lookup component looks up a particular blob associated with the identity if one exists. The identity component 1322 can be communicatively coupled to the guard verification component 1324. The identity component 1322 identifies a guard associated with a blob or account. The guard verification component 1324 compares the guard associated with the blob with the provided guard. If they match, it is an indication that the requesting entity knows the blob key. The access component 1320 also includes a human interactive proof component 1326. The HIP component 1326 generates a test that only a human being can solve and presents it to the user via interface 1310. A response can subsequently be received and the results compared to determine if the entity passes the test. Retrieval component 1328 interacts with data store 1330 and can retrieve blobs to be provided or distributed to the user through interface 1310. Prior to such action the retrieval component can receive input from the identity component identifying the blob to be returned, an indication from the guard verification component 1324 as to whether the guard match and the results of the test from HIP component 1326. If the user is a user as indicated by the HIP component results and the user knows the key associated with the blob, then the retrieval component can retrieve the blob identified and provided it back to the user through interface component 1310. If any of those tests fail, access is denied and the retrieval component 1328 will not provide the requesting entity with a blob.

Figure 14:
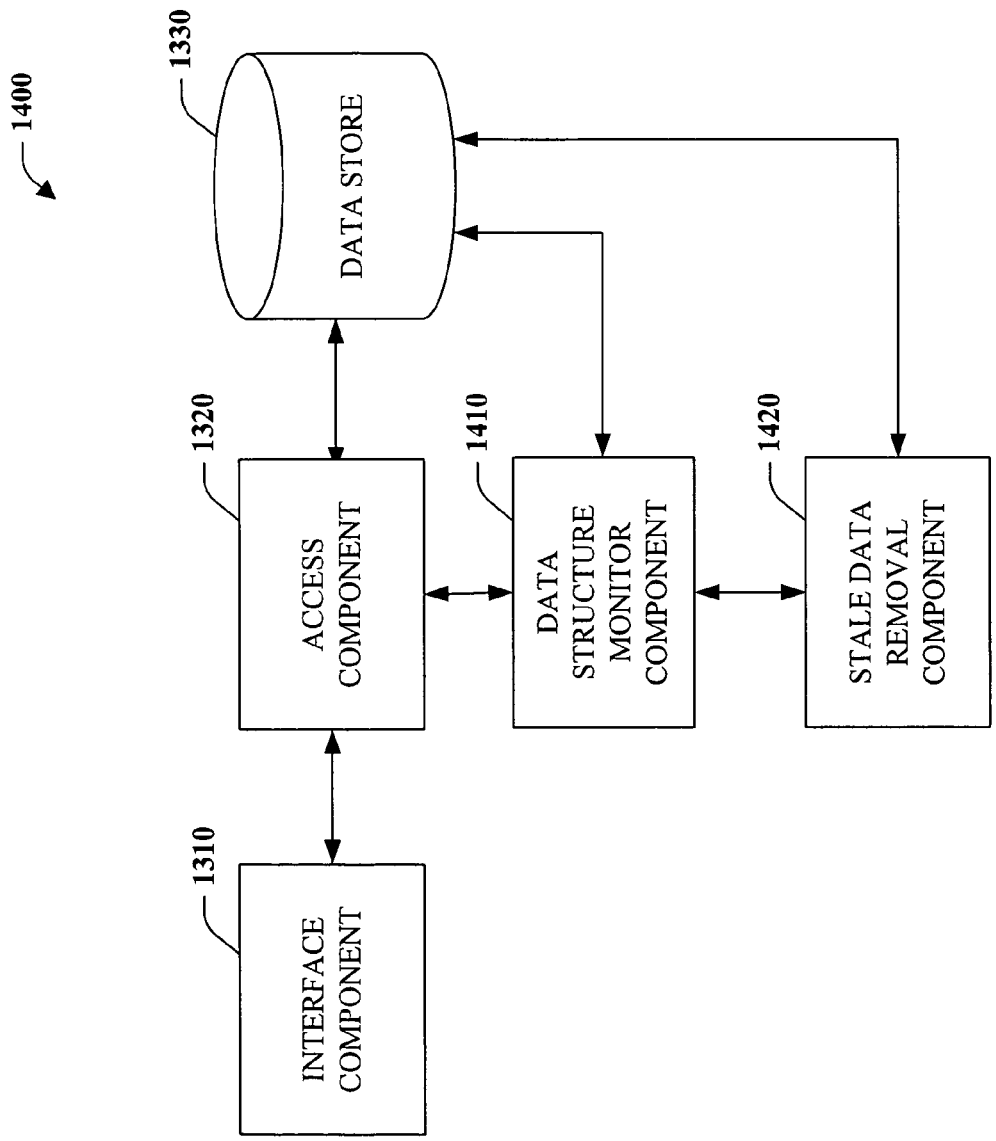
FIG. 14 is a block diagram of a data distribution system.

Turning to FIG. 14 a data distribution system 1400 is illustrated in accordance with an aspect of the subject innovation. System 1400 includes interface component 1310, access component 1320 and data store 1330, as previously described with respect to FIG. 13 and system 1300. In addition, the access system 1400 can include a data structure monitor component 1410 that interacts with the data store 1330. In particular, the data structure monitor component 1410 can maintain last-modified times on the various data structures (e.g., blobs, machine entries . . . ) housed in data store 1330. Further yet component 1410 can respond to if modified queries provided from access component 1320. Such requests can be automatically generated or periodically initiated by users via interface component 1310 to facilitate synchronization. System 1400 also includes a stale data removal component 1420. The component 1420 can interact with data structure monitor component 1410 to identify data structures that are stale or have not be access within a predetermined period of time. Upon identification of such structures, stale data removal component 1420 can remove those structures from data store 1330.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 15-26. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 15:
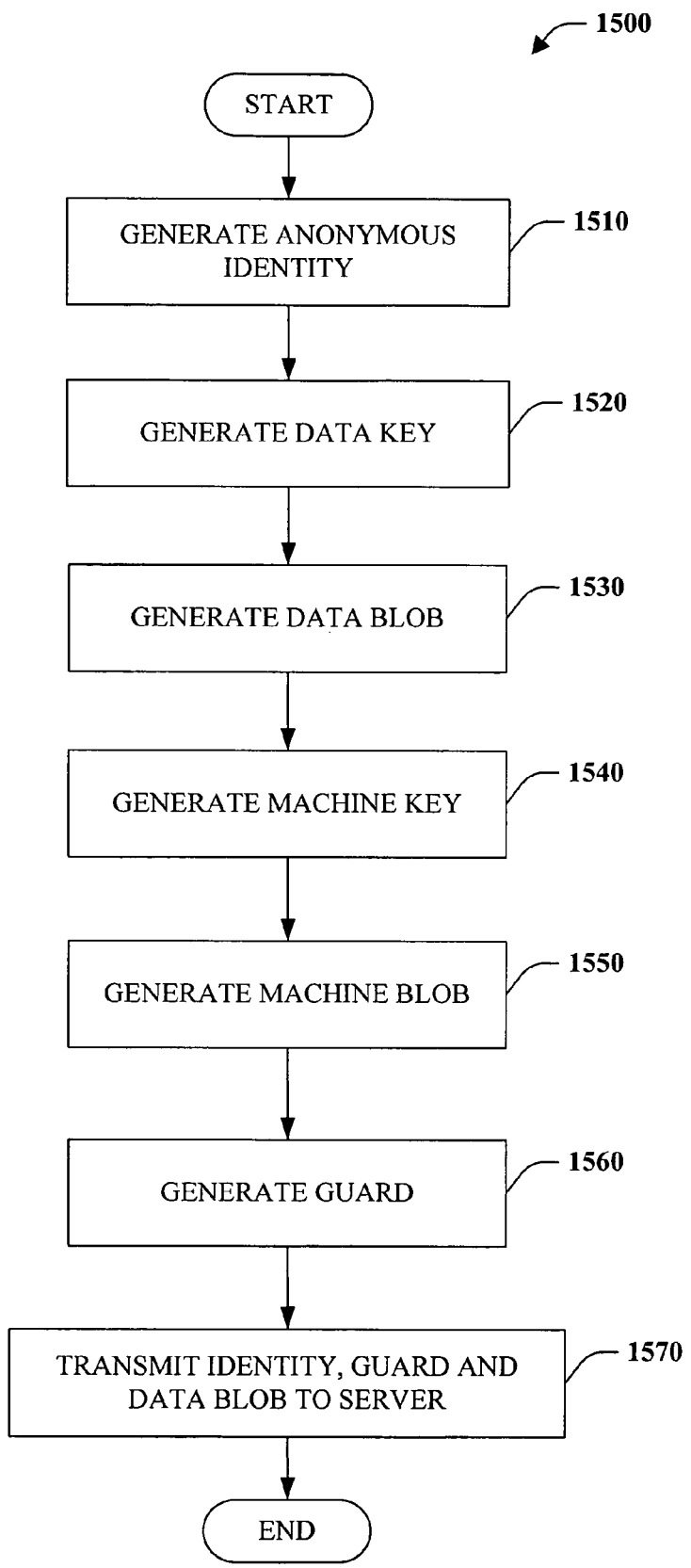
FIG. 15 is a flow chart diagram of a method of storing data.

Turning to FIG. 15, a method of storing data 1500 is provided in accordance with an aspect of the subject innovation. At reference numeral 1510, an anonymous identity is generated. For example, this can be accomplished utilizing a hash of one or more sources of information such as machine and user GUIDs. At 1520, a data key is generated. The data key can derived from one or more pieces of information or it can be a cryptographically safe random number. At reference 1530, a data blob is generated. The data blob includes client or user data encrypted utilizing the data key. At numeral 1540, a machine key is generated. The machine key can be a generated from a combination of sources including but not limited to machine GUID, user GUI, and user password. At numeral 1550, a machine blob is generated by encrypting the data key with the machine key. At 1560, a guard is generated for from at least the data key. At reference numeral 1570, the identity, guard, and data blob are transmitted to a server or like system.

Figure 16:
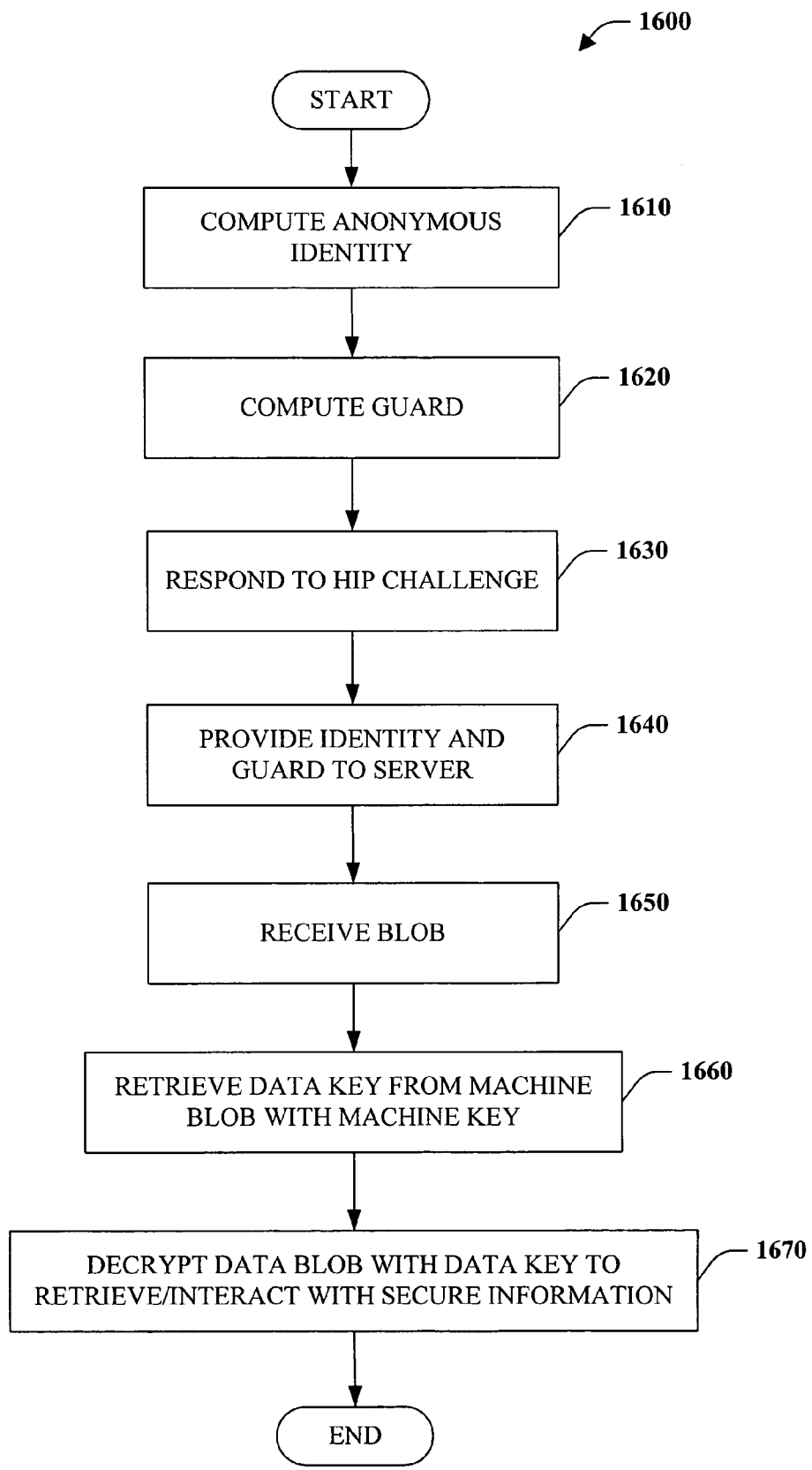
FIG. 16 is a flow chart diagram of a method of retrieving or otherwise interacting with data.

FIG. 16 depicts a method of retrieving data in accordance with an aspect of the subject innovation. At reference numeral 1610, an anonymous identity is generated. At 1620, a guard is computed. At numeral 1630, a human interactive proof challenge is responded to prevent attacks from automatons. This can involve, among other things, identifying obfuscated characters. At reference numeral 1640, the identity and guard are transmitted to a server or like system. At numeral 1650, a blob is received. At 1660, the data key is retrieved from a machine blob with a machine key, for example provided upon entry of a master password. At reference 1670, a data blob is decrypted with the data key and secure information is retrieved or otherwise utilized.

Figure 17:
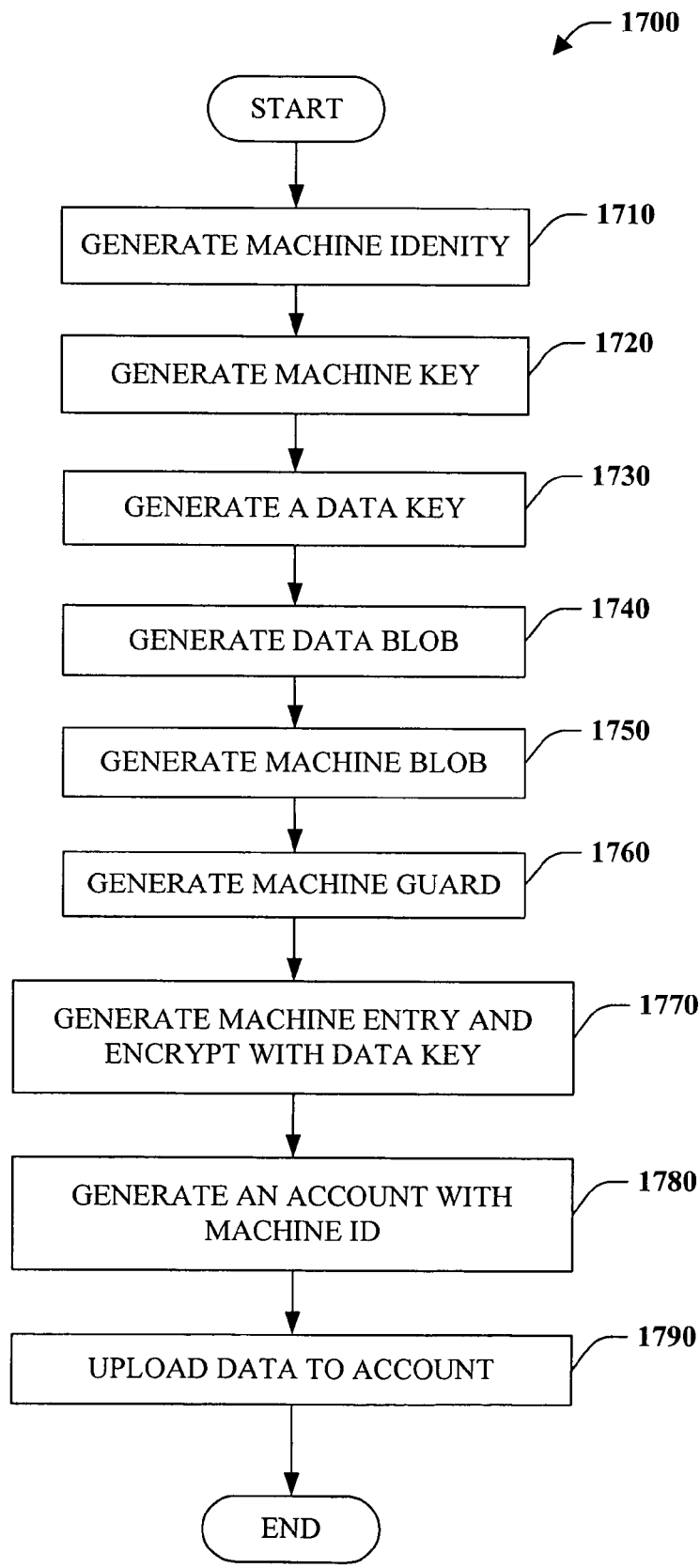
FIG. 17 is a flow chart diagram of a method of preparing for premeditated roaming.

FIG. 17 illustrates a method of preparing for premeditated roaming in accordance with an aspect of the subject innovation. At reference numeral 1710, a machine identity is generated. At 1720, a machine key is generated. At 1730, a data key is generated. At 1740, a data blob is generated by encrypting data with the data key. A machine blob is generated by encrypting a data key with the machine key, at 1750. At reference numeral 1760, a machine guard is generated. At numeral 1770, a machine entry is encrypted with the data key. The machine entry can include information about a system such as the machine and user GUIDs, among other things. At 1780, an account is generated with the machine id. At 1790, data is uploaded to the account including but not limited to the data blob and machine entry.

Figure 18:
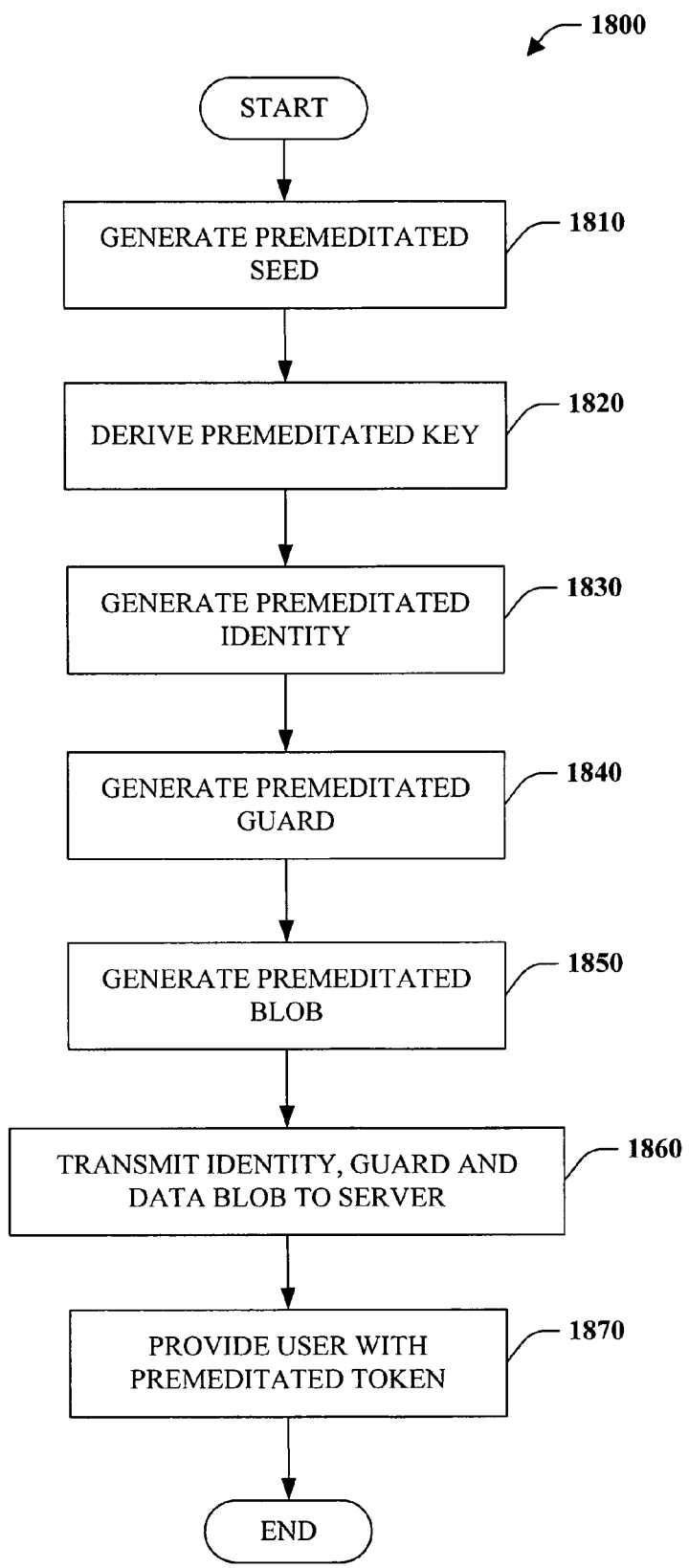
FIG. 18 is a flow chart diagram of a method of preparing for premeditated roaming.

FIG. 18 illustrates a method 1800 for preparing for premeditated roaming in accordance with an aspect of the innovation. At reference numeral 1810, a premeditated seed is generated, for instance utilizing a safe random number generator. At 1820, a premeditated key is derived for instance from the seed and a user password. At numeral 1830 a premeditated identity is generated perhaps also from the seed and user password. A premeditated guard is generated at 1840, based at least in part of the premeditated key. At 1850, a premeditated blob is generated by encrypting a data key with the premeditated key. At reference 1860, the identity, guard, and blob are transmitted to a server or like system for storage. At reference, numeral 1870 a premeditated token including the seed and various constraints on use is generated and provided to a user.

Figure 19:
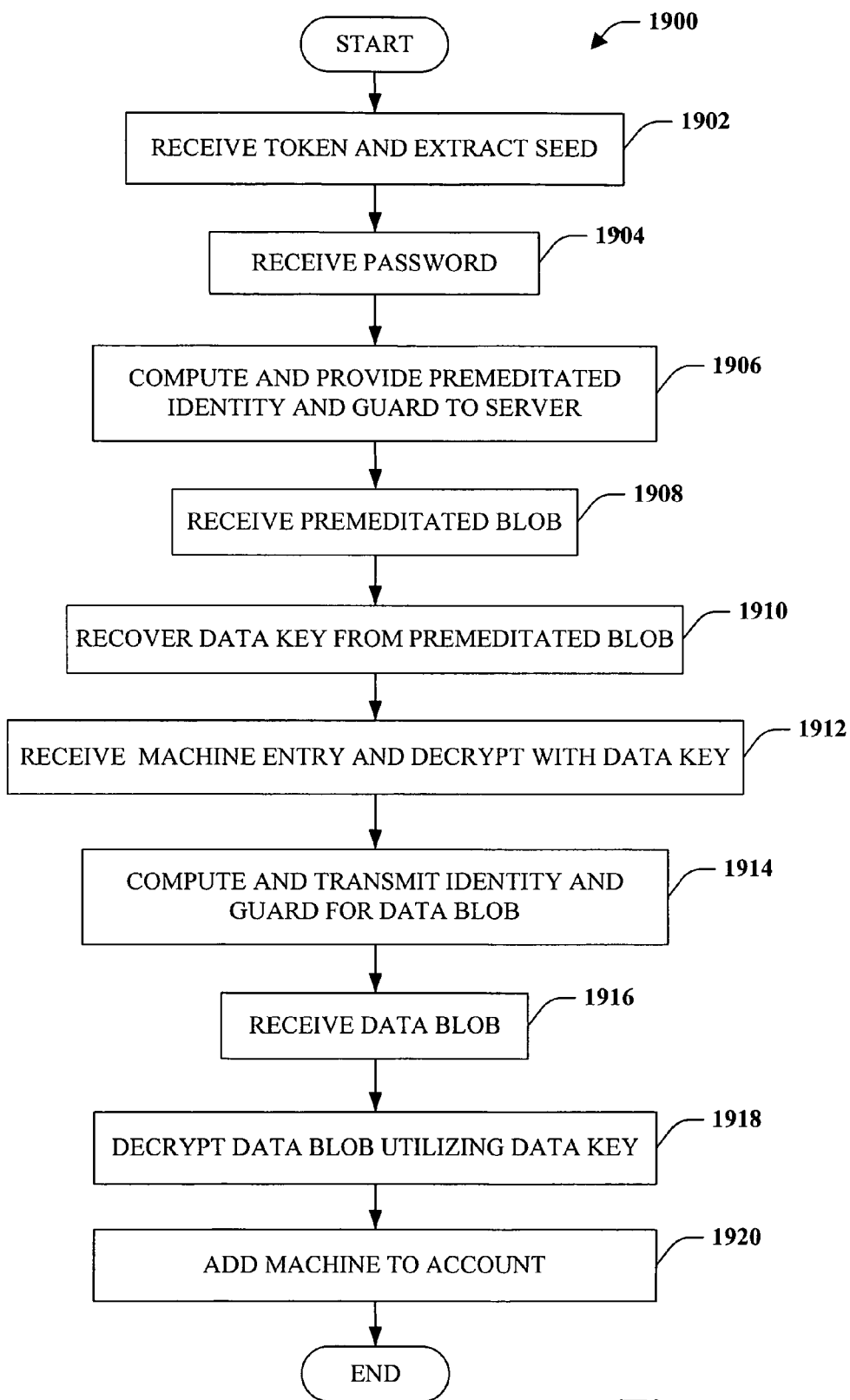
FIG. 19 is a flow chart diagram of a method of premeditated roaming.

Turning to FIG. 19, a method 1900 of premeditated roaming is illustrated. At reference numeral 1902, a token is received and the seed extracted. A user password is then received at 1904. At reference 1906, a premeditated identity and guard are generated and provided to a server. A premeditated blob is received at 1908. At numeral 1910, the data key is recovered from the premeditated blob by decrypting the blob utilizing a premeditated key, for instance. At 1912, the machine entry is received and decrypted with the data key. The identity and guard are generated and transmitted to a server at numeral 1914. A data blob is received from the server at 1916. At numeral 1918, the data blob is decrypted utilizing the data key. At 1920, the roaming machine can be added to the account for instance linking the machine and user GUIDs to the present account identity. The token can be destroyed if specified for one time use; otherwise, the token can be employed until it expires.

Figure 20:
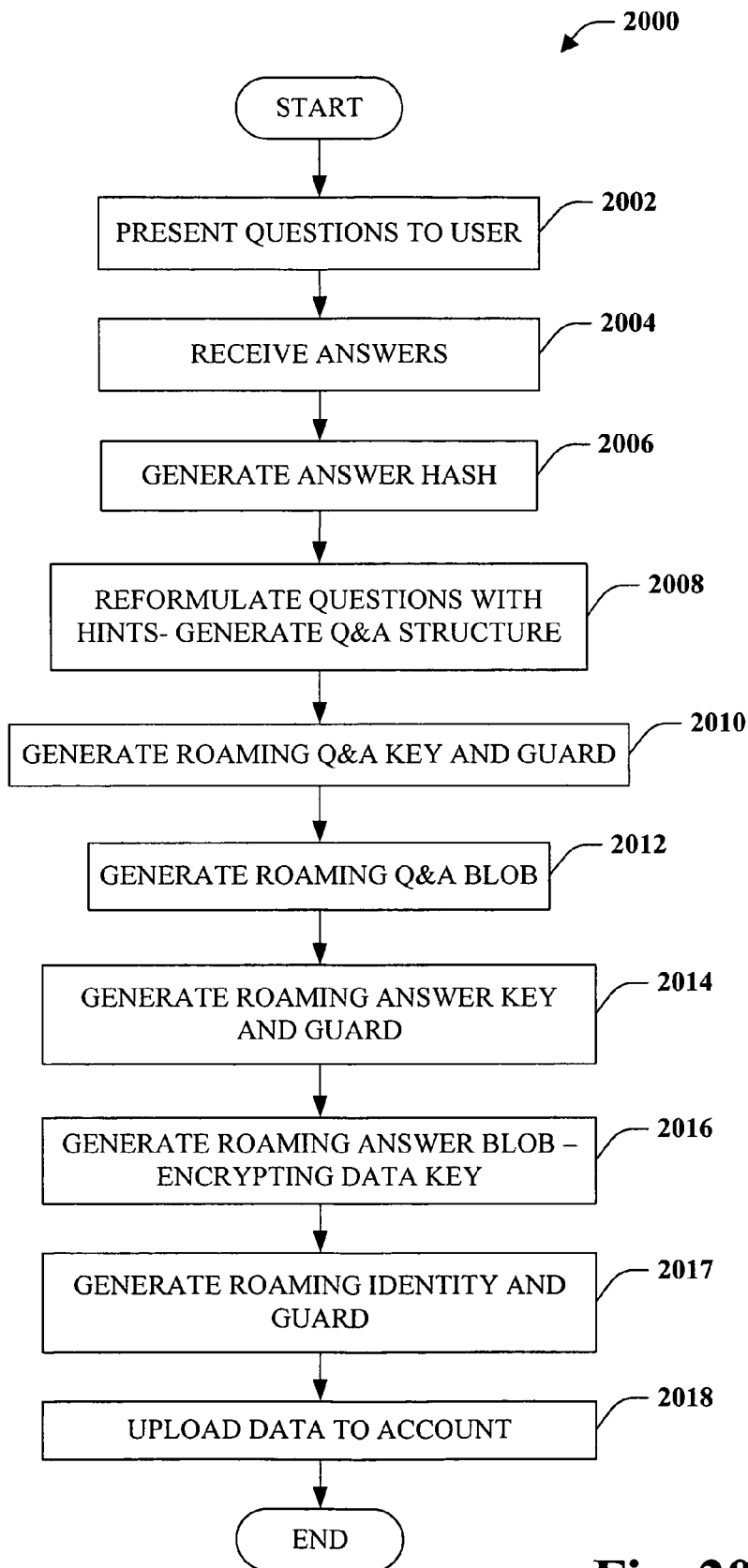
FIG. 20 is a flow chart diagram of a method of preparing for random roaming.

FIG. 20 illustrates a method of preparing for random roaming in accordance with an aspect of the subject innovation. At reference numeral 2002, questions are presented to a user. Answers to those questions are received at 2004. A hash of the answers can be generated at 2006. At reference numeral 2008, the questions are reformulated with hints and question and an answer Q&A structure is generated. At numeral 2010, a roaming Q&A key and guard are generated, for example from answers to questions and/or a user password. At reference 2012, a roaming Q&A blob is generated by encrypting the Q&A structure with the Q&A key. At numeral 2014, a roaming answer key and guard are generated. For example, the answer key can be derived from the generated answer hash, and the guard can be derived from the key and some system salt. At reference numeral 2016, a roaming answer blob is generated by encrypting a data key with the roaming answer key. At reference numeral 2017, a linked or roaming identity and guard are generated. For example, the roaming identity can be created from particular answers (e.g., identity answers) and a user password. The roaming guard can be a hash derived from some answers and the data key. At 2018, data is uploaded to the account including but not limited to the roaming Q&A guard and blob, the answer guard and blob, the roaming identity and the roaming guard.

Figure 21:
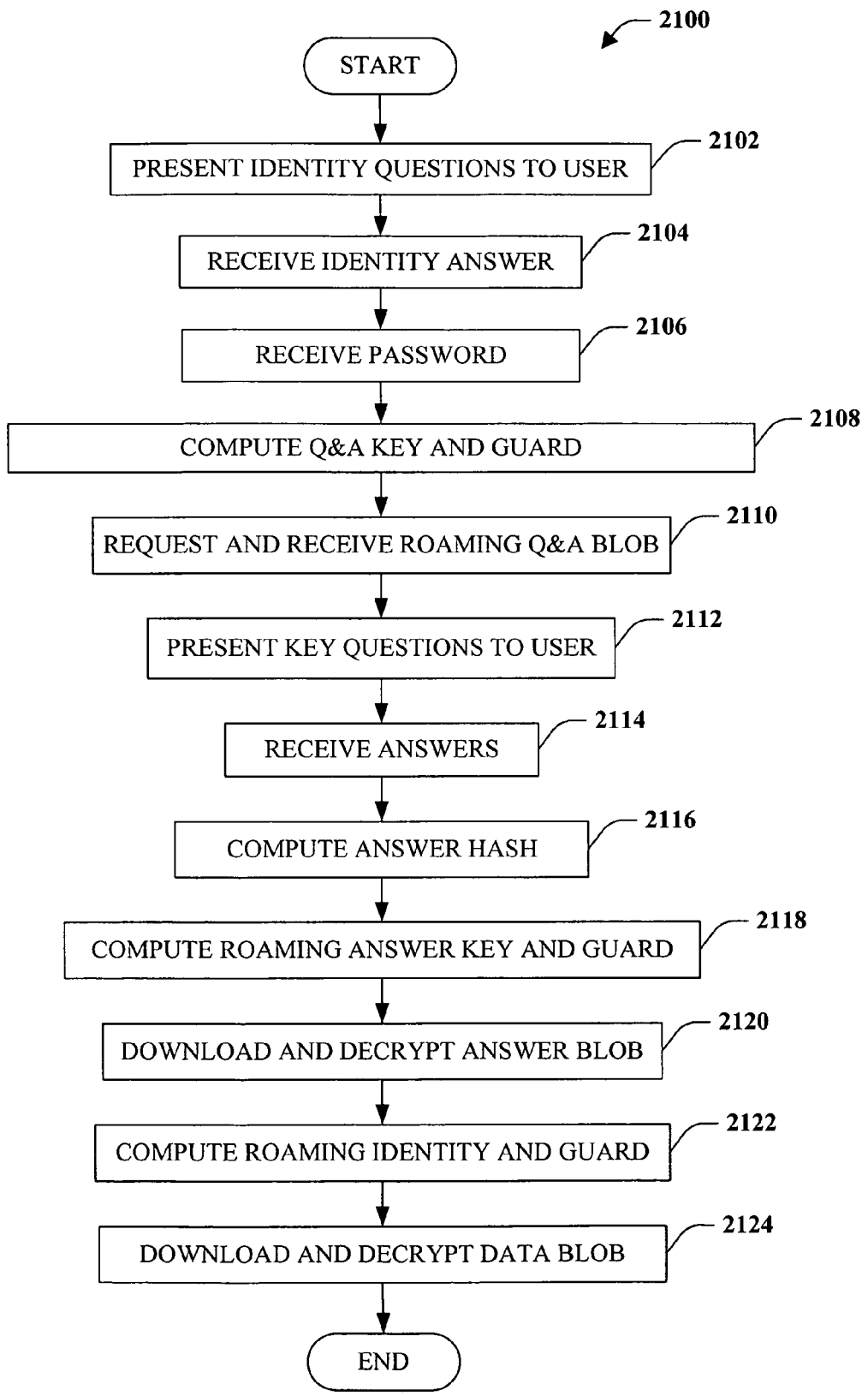
FIG. 21 is a flow chart diagram of a method of random roaming.

FIG. 21 illustrates a method 2100 of random roaming in accordance with an aspect of the subject innovation. At 2102, identity questions are presented to a user. Answers to the identity questions are received at 2104. At numeral 2106, a user password is received. A Q&A key and guard are computed at reference 2108. At numeral 2110, the roaming Q&A blob is requested, received, and decrypted with the Q&A key to reveal a Q&A structure. At numeral 2112, key questions are presented to a user and answers to those questions are received at 2114. A hash of the answers is created at 2116. At reference 2118, the roaming answer key and guard are computed at least in part from the answer hash. The answer blob is downloaded and decrypted at 2120 to reveal the data key. The roaming identity and guard are computed at 2122. For example, the roaming identity can be derived from the identity answers and the user password, while the guard can be generated from identity answers and the data key. At reference numeral 2124, the roaming identity, roaming guard, and data key are employed to download and decrypt the data blob to reveal stored user data.

Figure 22:
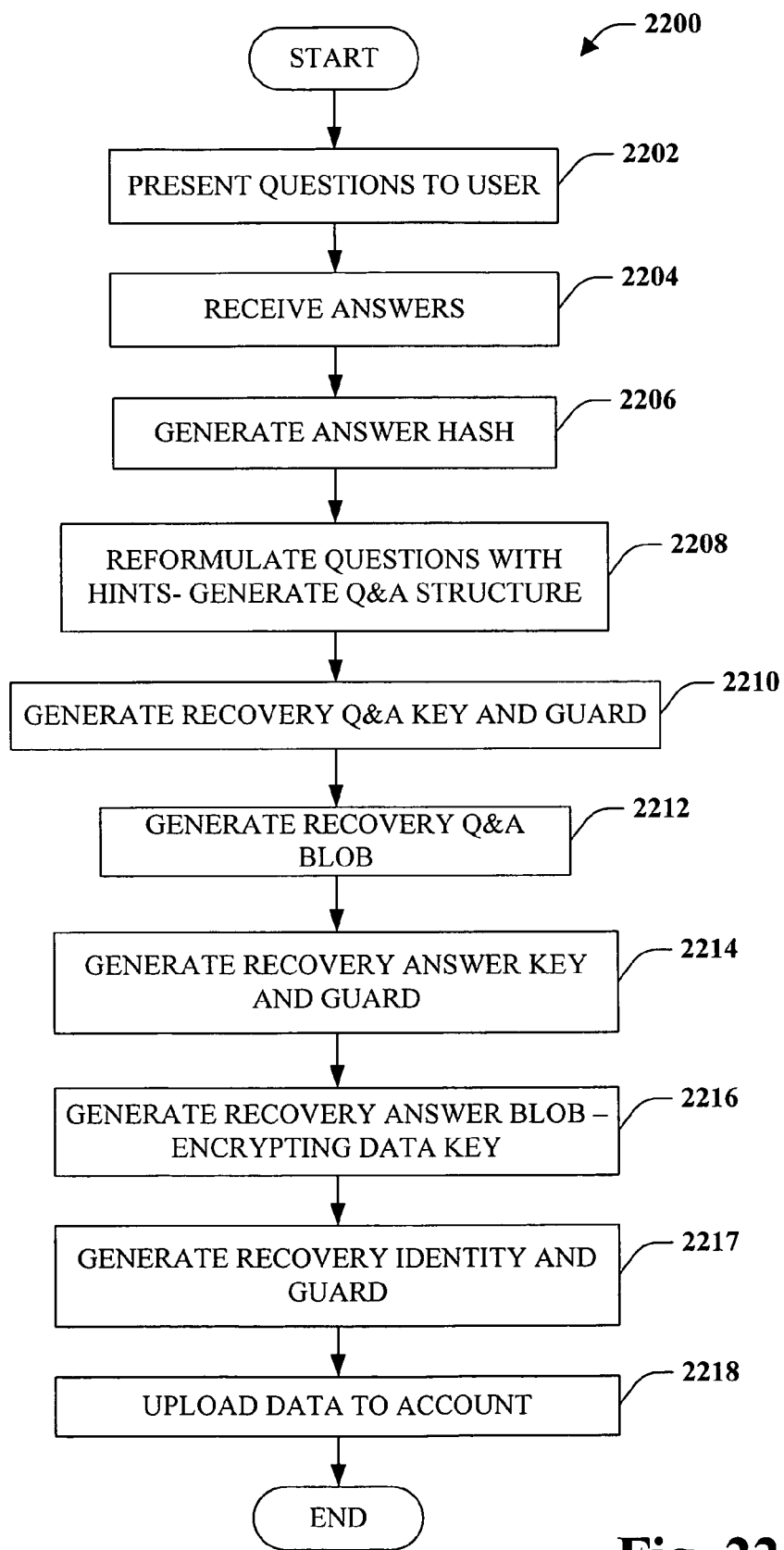
FIG. 22 is a flow chart diagram of a method of setting a machine up for recovery.

FIG. 22 depicts a method 2200 for setting up a computer for recovery in accordance with an aspect of the subject innovation. At reference numeral 2202, questions are presented to a user and answers received at 2204. An answer hash is generated based on those answers at 2206. The questions are reformulated with hints and a Q&A structure generated at 2208. At numeral 2210, recovery Q&A key and guard are generated. For example, the key can be derived from answers to identity questions as well as the machine and user GUIDs, while the guard can be generated as a hash of the key plus some system salt. At reference 2212, a recovery Q&A blob is generated by encrypting the Q&A structure with the Q&A key. A recovery answer key (derived from answer hash) and guard (derived from has of answer key) are generated at 2214. A recovery answer blob is generated by encrypting the data key with the answer key at 2216. At reference 2217, a recovery identity and guard are created linking to an account. At numeral 2218, data is uploaded to an account such as the Q&A blob and guard, the answer blob and guard, and the recovery identity and guard if generated.

Figure 23:
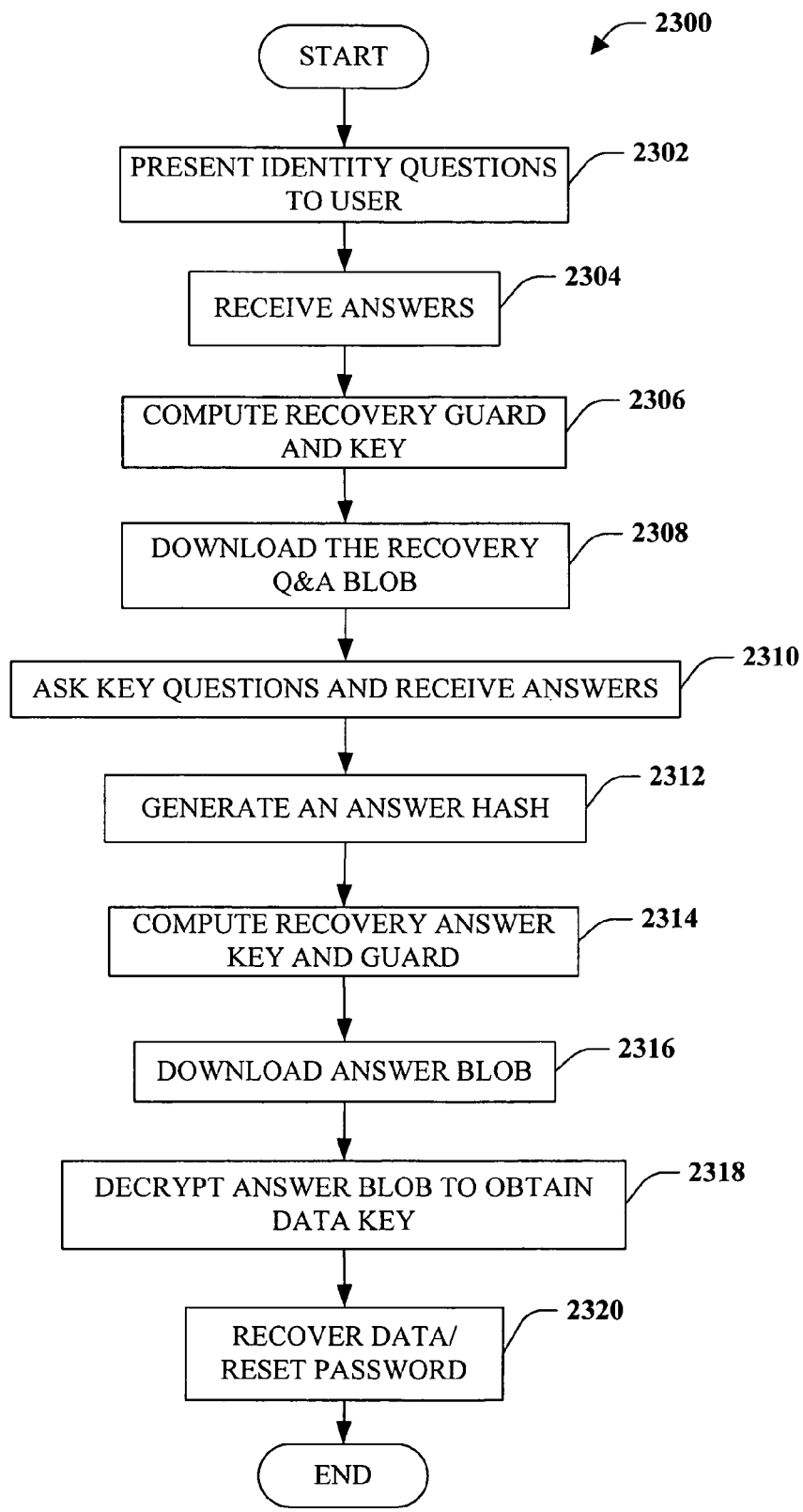
FIG. 23 is a flow chart diagram of a recovery method.
Figure 24:
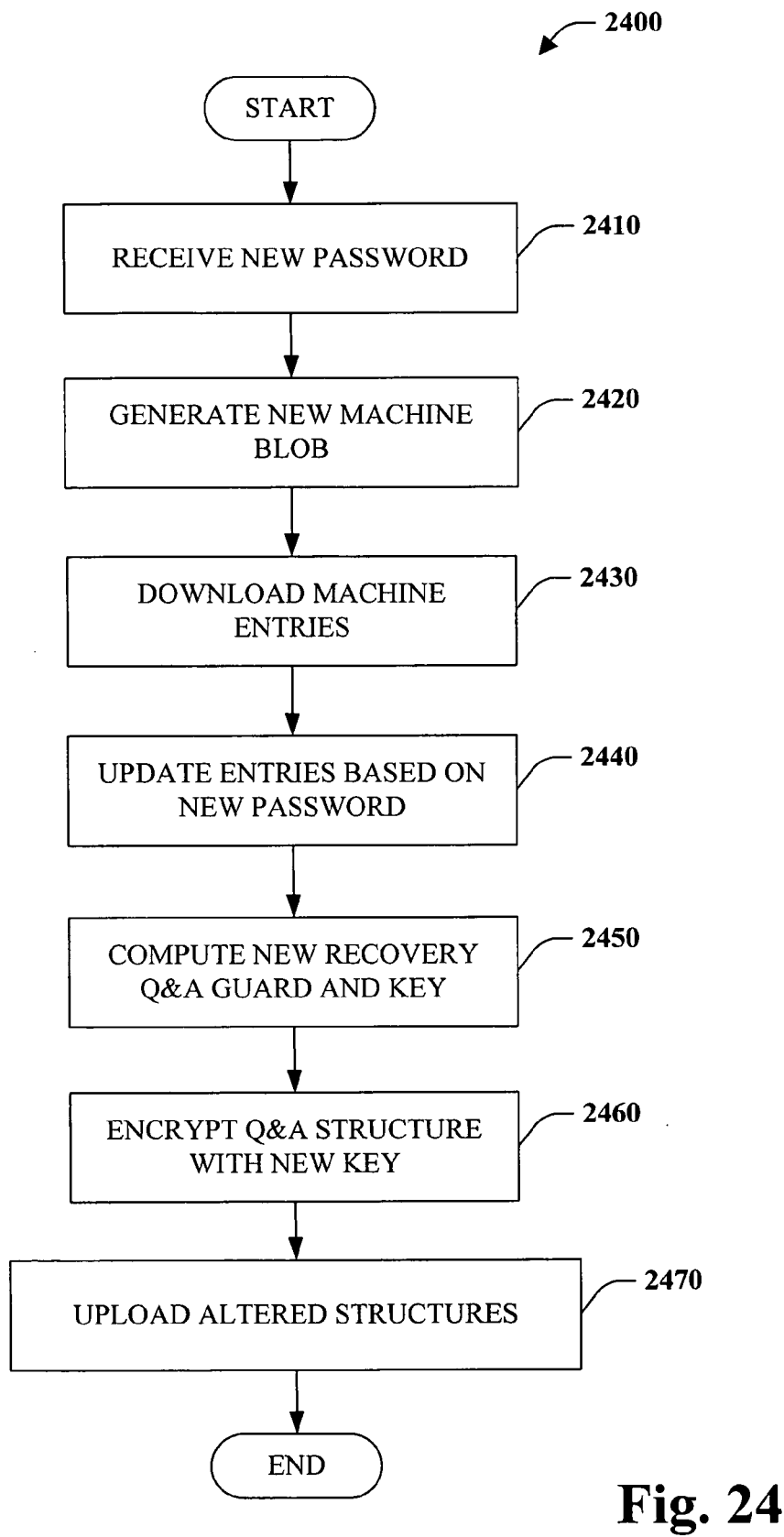
FIG. 24 is a flow chart diagram of a method resetting a password.

FIG. 23 is a flow chart diagram depicting a method 2300 of recovery in accordance with an aspect of the subject innovation. At numeral 2302, identity questions are presented to a user. The answers to the identity questions are received at 2304. At reference 2306, recovery guard and are computed based at least in part on the identity answers. At 2308, the recovery Q&A blob is downloaded and decrypted utilizing the recovery guard and key. At reference numeral 2310, key questions are asked and answers received. An answer hash is then generated, at 2312, from the answers. At reference 2314, the recovery answer key and guard are computed base at least in part on the answer hash. The answer blob is downloaded at 2316 utilizing at least the answer guard. At 2318, the answer blob is decrypted with the answer key to obtain the data key. At reference numeral 2320, data is recovered and/or password rest FIG. 24 illustrates a password reset methodology in accordance with an aspect of the subject innovation. Prior to the subject acts, the acts of method 2300 can be performed. At reference numeral 2410, a new password is received. A new machine blob is generated at 2420 as the machine blob is encrypted with a data key, which can be derived at least in part from a user password. At 2430, the machine entry is downloaded and decrypted. Entries are dependent directly or indirectly on the altered password are updated at 2440. At reference 2450, a new recovery Q&A guard and key are computed. At 2460, the Q&A structure is encrypted with the new key. At reference 2470, the updated structures such as the blob, key, guard, structure, machine entry, etc. are uploaded to an account.

Figure 25:
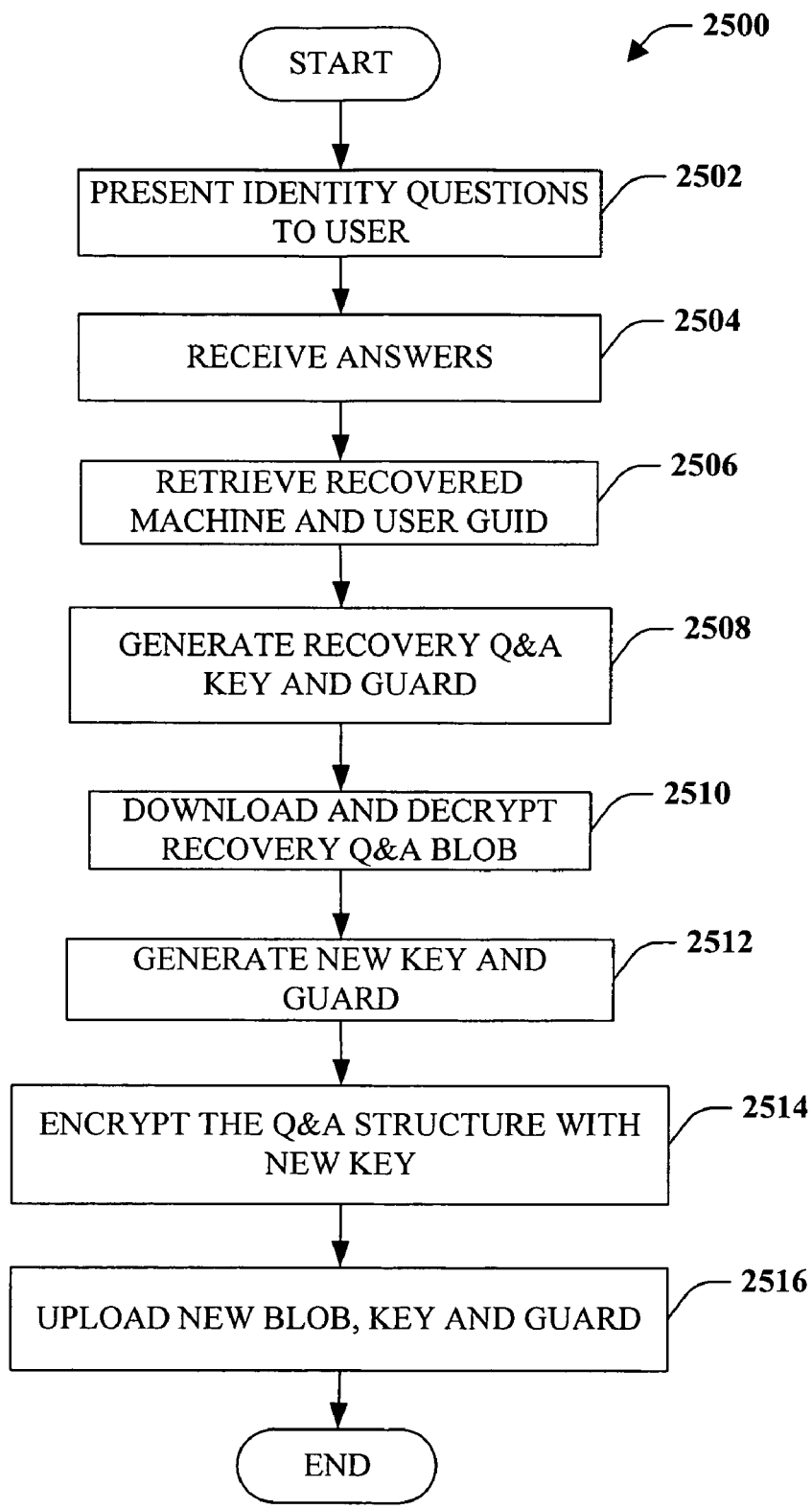
FIG. 25 is a flow chart diagram of a method of enabling recovery from an added machine.

FIG. 25 illustrates a method 2500 of enabling recovery in accordance with an aspect of the subject innovation. At 2502, identity questions are presented to a user and answers received at 2504. At reference numeral 2506, recovered machine and user GUIDs are retrieved, for example from a machine entry. Recovery Q&A key and guard are generated at 2508. At 2510, the recovery Q&A blob is downloaded and decrypted with the Q&A guard and key. A new key and guard are generated at 2512 using the new machine's GUID and the user GUID (which will be different on each machine). Employing the new key the decrypted Q&A structure is re-encrypted at 2514. At reference 2516, the blob, key, and guard are uploaded and associated with the new machine identity. At this point, a user can recover data from this machine such as a newly added machine utilizing a premeditated token.

Figure 26:
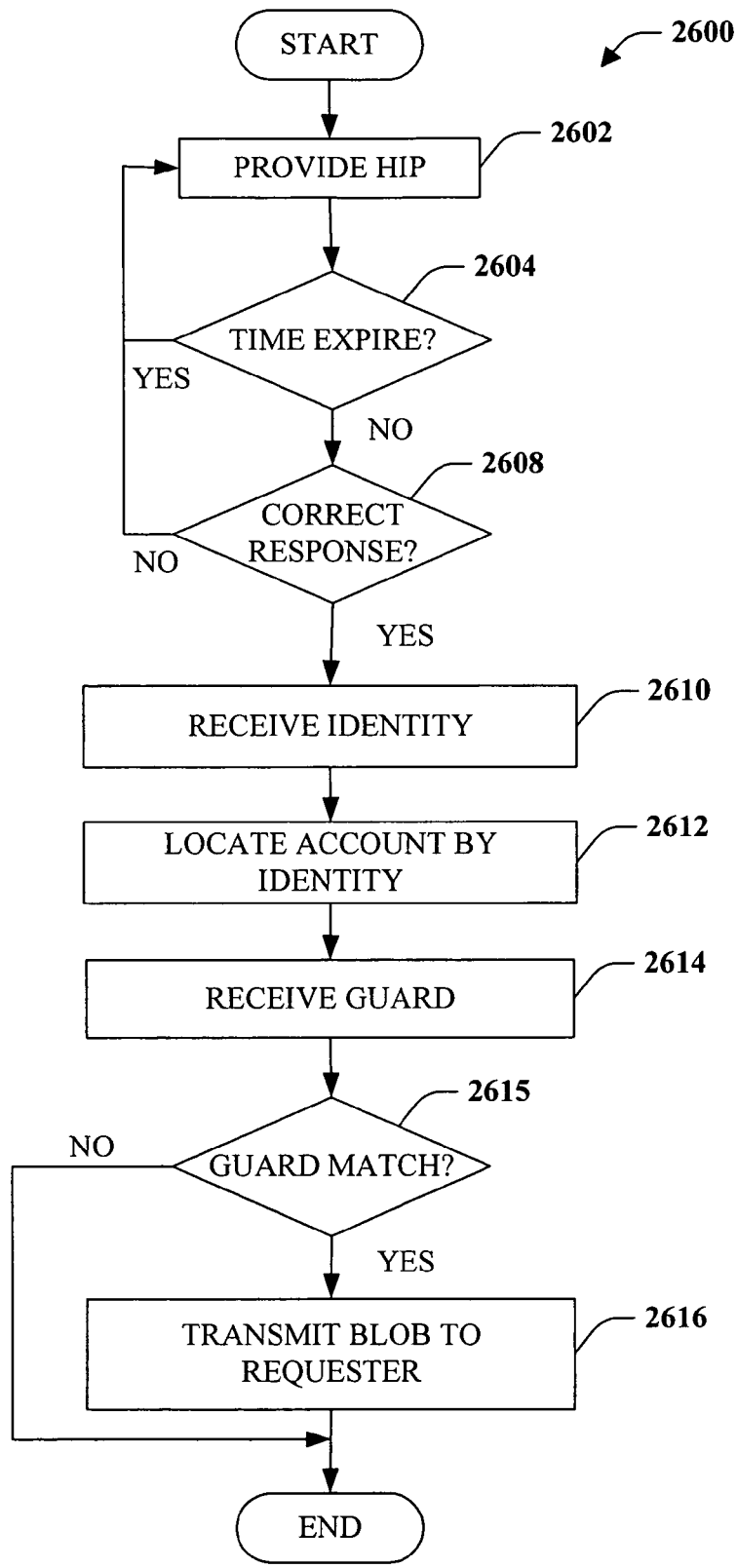
FIG. 26 is a flow chart diagram of a method of distributing blobs.

FIG. 26 illustrates a flow chart diagram of a method 2600 of distributing data. Method 2600 can be but is not limited to being executed by a server. At reference numeral 2602, a human interactive proof challenge is provided. At 2604, a determination is made as to whether the time expired for a response. If yes, a new challenge is provided. If no, the method proceeds to 2608 where a determination is made as to whether the response is correct. If no, a new challenge is provided. If yes, the method continues at 2610 where an identity is received. At 2612, an account is located utilizing the received identity. The account can include a plurality of related structures including one or more blobs, machine entries and the like. At reference numeral 2614, a guard is received. At 2615, a determination is made as to whether the received guard matches a guard associated with an identified account blob. If the blob guards match, the corresponding blob is transmitted to a requester at 2616. If at 2615, it is determined that the guards do not match, then the method can simply terminate. If the guard does not match this indicates that a requester does not know the guard. Accordingly, the blob will not be transmitted so as to avoid an offline brute force attach on the blob to decrypt it and determine the contents thereof.

Figure 27:
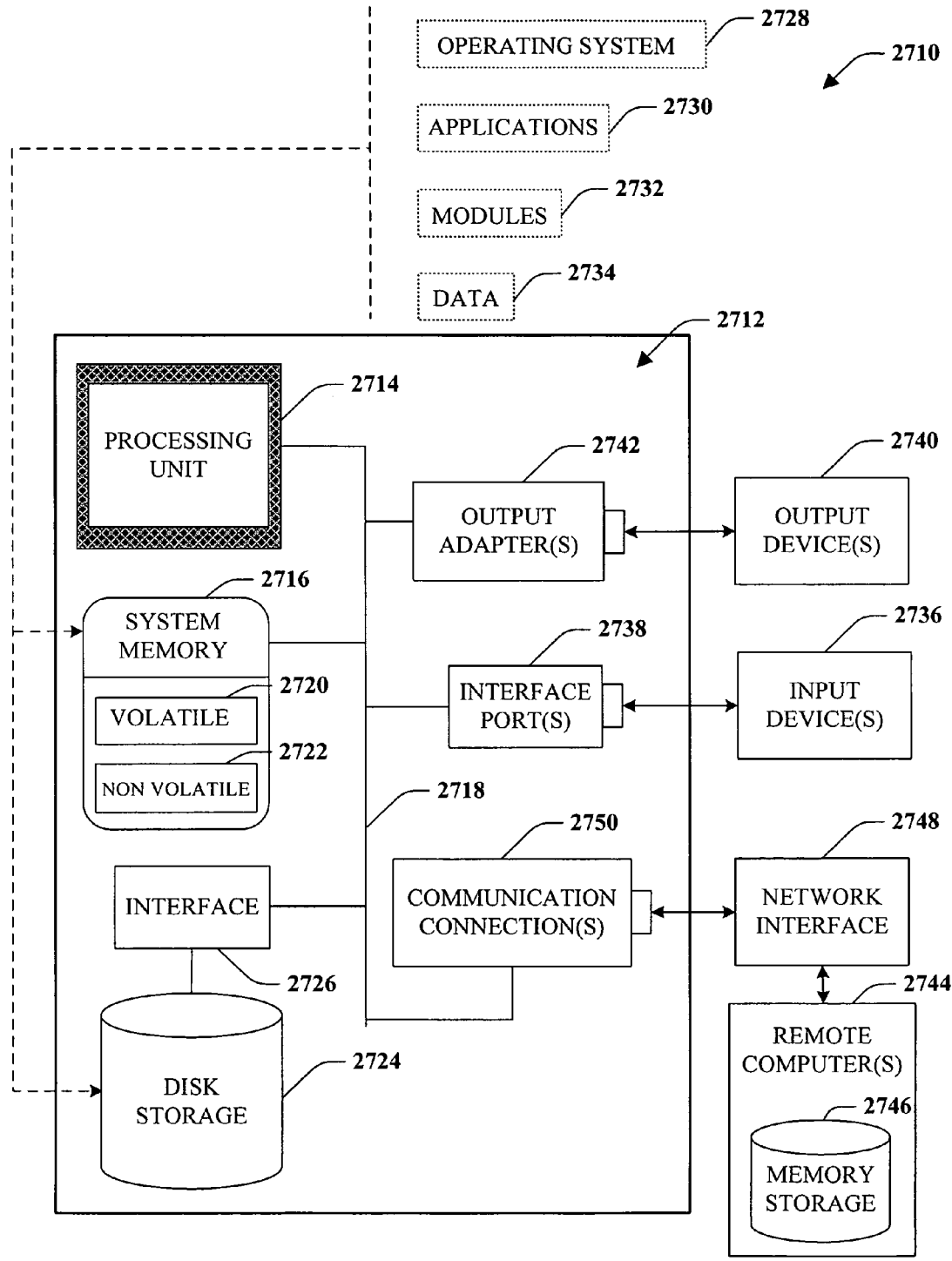
FIG. 27 is a schematic block diagram illustrating a suitable operating environment for aspects of the subject innovation.
Figure 28:
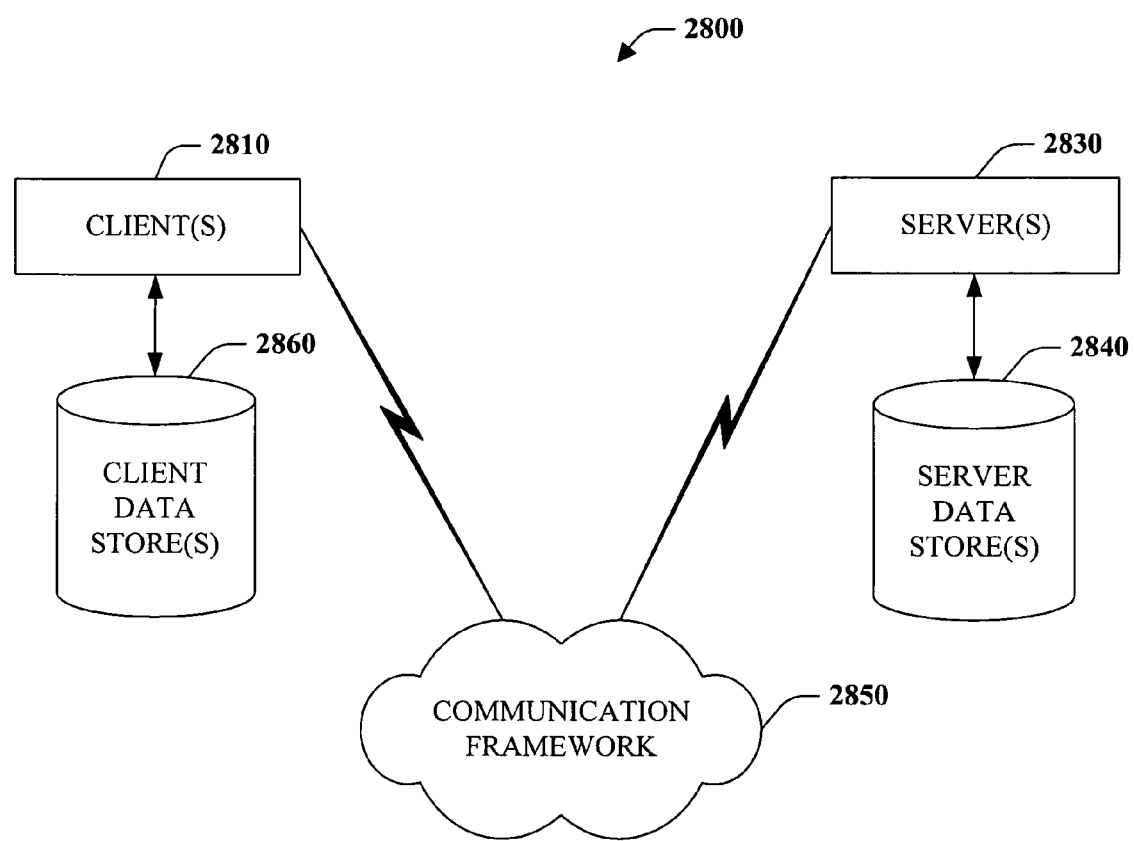
FIG. 28 is a schematic block diagram of a sample-computing environment.

In order to provide a context for the various aspects of the disclosed subject matter, FIGS. 27 and 28 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 27, an exemplary environment 2710 for implementing various aspects disclosed herein includes a computer 2712 (e.g., desktop, laptop, server, hand held, programmable consumer or industrial electronics . . . ). The computer 2712 includes a processing unit 2714, a system memory 2716, and a system bus 2718. The system bus 2718 couples system components including, but not limited to, the system memory 2716 to the processing unit 2714. The processing unit 2714 can be any of various available microprocessors. Dual microprocessors and other multiprocessor architectures also can be employed as the processing unit 2714.

The system bus 2718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2716 includes volatile memory 2720 and nonvolatile memory 2722. The basic input/output system (BIOS), containing the basic routines to transfer information between elements within the computer 2712, such as during start-up, is stored in nonvolatile memory 2722. By way of illustration, and not limitation, nonvolatile memory 2722 can include read only memory (ROM), programmable ROM (PROM), electrically programmable ROM (EPROM), electrically erasable ROM (EEPROM), or flash memory. Volatile memory 2720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2712 also includes removable/non-removable, volatile/non-volatile computer storage media. FIG. 27 illustrates, for example, disk storage 2724. Disk storage 2724 includes, but is not limited to, devices like a magnetic disk drive, floppy disk drive, tape drive, Jaz drive, Zip drive, LS-100 drive, flash memory card, or memory stick. In addition, disk storage 2724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2724 to the system bus 2718, a removable or non-removable interface is typically used such as interface 2726.

It is to be appreciated that FIG. 27 describes software that acts as an intermediary between users and the basic computer resources described in suitable operating environment 2710. Such software includes an operating system 2728. Operating system 2728, which can be stored on disk storage 2724, acts to control and allocate resources of the computer system 2712. System applications 2730 take advantage of the management of resources by operating system 2728 through program modules 2732 and program data 2734 stored either in system memory 2716 or on disk storage 2724. It is to be appreciated that the present invention can be implemented with various operating systems or combinations of operating systems.

A user enters commands or information into the computer 2712 through input device(s) 2736. Input devices 2736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2714 through the system bus 2718 via interface port(s) 2738. Interface port(s) 2738 include, for example, a serial port, a parallel port, a game port, and a universal serial bus (USB). Output device(s) 2740 use some of the same type of ports as input device(s) 2736. Thus, for example, a USB port may be used to provide input to computer 2712 and to output information from computer 2712 to an output device 2740. Output adapter 2742 is provided to illustrate that there are some output devices 2740 like displays (e.g., flat panel and CRT), speakers, and printers, among other output devices 2740 that require special adapters. The output adapters 2742 include, by way of illustration and not limitation, video and sound cards that provide a means of connection between the output device 2740 and the system bus 2718. It should be noted that other devices and/or systems of devices provide both input and output capabilities such as remote computer(s) 2744.

Computer 2712 can operate in a networked environment using logical connections to one or more remote computers, such as remote computer(s) 2744. The remote computer(s) 2744 can be a personal computer, a server, a router, a network PC, a workstation, a microprocessor based appliance, a peer device or other common network node and the like, and typically includes many or all of the elements described relative to computer 2712. For purposes of brevity, only a memory storage device 2746 is illustrated with remote computer(s) 2744. Remote computer(s) 2744 is logically connected to computer 2712 through a network interface 2748 and then physically connected via communication connection 2750. Network interface 2748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 2750 refers to the hardware/software employed to connect the network interface 2748 to the bus 2718. While communication connection 2750 is shown for illustrative clarity inside computer 2716, it can also be external to computer 2712. The hardware/software necessary for connection to the network interface 2748 includes, for exemplary purposes only, internal and external technologies such as, modems including regular telephone grade modems, cable modems, power modems and DSL modems, ISDN adapters, and Ethernet cards or components.

FIG. 28 is a schematic block diagram of a sample-computing environment 2800 with which the subject innovation can interact. The system 2800 includes one or more client(s) 2810. The client(s) 2810 can be hardware and/or software (e.g., threads, processes, computing devices). The system 2800 also includes one or more server(s) 2830. Thus, system 2800 can correspond to a two-tier client server model or a multi-tier model (e.g., client, middle tier server, data server), amongst other models. The server(s) 2830 can also be hardware and/or software (e.g., threads, processes, computing devices). The servers 2830 can house threads to perform transformations by employing the subject innovation, for example. One possible communication between a client 2810 and a server 2830 may be in the form of a data packet transmitted between two or more computer processes.

The system 2800 includes a communication framework 2850 that can be employed to facilitate communications between the client(s) 2810 and the server(s) 2830. The client(s) 2810 are operatively connected to one or more client data store(s) 2860 that can be employed to store information local to the client(s) 2810. Similarly, the server(s) 2830 are operatively connected to one or more server data store(s) 2840 that can be employed to store information local to the servers 2830.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A secure and anonymous data interaction system comprising the following computer executable components:
    a transmission component that provides an anonymous identity and a guard to a server; and
    a receiver component that receives a data blob from the server, if the provided identity and guard match an identity and guard associated with the data blob, wherein the guard is based at least in part on a data key that is used to decrypt the data blob.

2. The system of claim 1, further comprising a key generation component that generates a machine key.

3. The system of claim 2, the machine key is derived from machine and user globally unique identifiers and a user password.

4. The system of claim 2, further comprising a machine decryption component that decrypts a machine blob with the machine key to reveal a data key.

5. The system of claim 4, further comprising a guard generation component that generates the guard based at least in part on the data key.

6. The system of claim 5, the data key is a cryptographically safe random number.

7. The system of claim 5, further comprising an identity generation component that generates the anonymous identity from machine and user globally unique identifiers (GUIDs).

8. The system of claim 7, further comprising a data decryption component that decrypts the data blob with the data key to reveal user data.

9. The system of claim 8, further comprising an application component that automatically completes login/password fields based on the user data.

10. A method comprising:
    configuring at least one processor of a server to perform the acts of:
    receiving a request for a blob including an identity and guard, wherein the guard is based at least in part on a key that is employed to decrypt the blob;
    locating the blob associated with the identity; and
    transmitting the blob to a requesting entity if the received guard matches the guard associated with the blob.

11. The method of claim 10, further comprising preventing transmission of the blob until and unless it is verified that a human being initiated the request for the blob.

12. The method of claim 10, further comprising monitoring the last modified times associated with the blob to enable response to last modified queries.

13. The method of claim 12, further comprising removing blobs and related structures if not interacted with for a predetermined time.

14. A method of interacting with data comprising:
    configuring at least one processor of at least one client computer to perform the acts of;
    transmitting a first identity and guard to a server; and
    receiving a first blob if the provided identity and guard match an identity and guard associated with the first blob managed by the server, wherein the guard is based at least in part on a first key used to decrypt the first blob.

15. The method of claim 14, further comprising retrieving a first key from a second blob.

16. The method of claim 15, further comprising:
    transmitting a second identity and guard to the server;
    receiving the second blob if the provided second identity and guard match an identity and guard associated with the second blob managed by the server.

17. The method of claim 15, retrieving a first key comprises generating a second key and decrypting the second blob with the second key thereby revealing the first key.

18. The method of claim 14, further comprising applying the first key to the first blob thereby decrypting the blob and revealing user data.

19. The method of claim 18, further comprising encrypting the user data with the first key thereby generating the first blob and uploading the first blob to the server.

20. The method of claim 14, further comprising:
    generating a premeditated identity and guard from a token;
    transmitting the premeditated identity and guard to the server;
    receiving a premeditated blob if the premeditated identity and guard match the corresponding elements associated with the premeditated blob housed by the server;
    decrypting the premeditated blob with a premeditated key to reveal a first key;
    providing the first key to the server to facilitate retrieval of a machine entry housing data required to generate the first identity and guard, and applying the first key to the first blob to decrypt the blob and reveal user data.

* * * * *

UNITED STATES PATENT AND TRADEMARK OFFICE
CERTIFICATE OF CORRECTION

PATENT NO. : 7,593,548 B2  Page 1 of 1
APPLICATION NO. : 11/300920
DATED : September 22, 2009
INVENTOR(S) : Dharmarajan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Fourteenth Day of December, 2010

David J. Kappos
*Director of the United States Patent and Trademark Office*